(12) United States Patent
Maheshwari et al.

(10) Patent No.: US 11,089,474 B2
(45) Date of Patent: *Aug. 10, 2021

(54) UNIFIED PROVISIONING OF APPLICATIONS ON DEVICES IN AN ENTERPRISE SYSTEM

(71) Applicant: Oracle International Corporation, Redwood Shores, CA (US)

(72) Inventors: Harsh Maheshwari, Indore (IN); Mohamad Raja Gani Mohamad Abdul, Belmont, CA (US); Sidhartha Das, Bangalore (IN); Rajesh Pakkath, San Ramon, CA (US); Sreedhar Katti, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 309 days.

This patent is subject to a terminal disclaimer.

(21) Appl. No.: 16/161,939

(22) Filed: Oct. 16, 2018

(65) Prior Publication Data
US 2019/0052624 A1    Feb. 14, 2019

Related U.S. Application Data

(63) Continuation of application No. 15/601,832, filed on May 22, 2017, now Pat. No. 10,116,647, which is a
(Continued)

(51) Int. Cl.
*G06F 21/00* (2013.01)
*H04W 12/06* (2021.01)
(Continued)

(52) U.S. Cl.
CPC .............. *H04W 12/06* (2013.01); *G06F 8/60* (2013.01); *G06F 8/61* (2013.01); *G06F 8/65* (2013.01);
(Continued)

(58) Field of Classification Search
CPC .......... G06F 21/30; G06F 21/44; G06F 21/45; G06F 21/50; G06F 21/52; G06F 21/57
See application file for complete search history.

(56) References Cited

U.S. PATENT DOCUMENTS

| 6,272,545 B1 | 8/2001 | Flanagin et al. |
| 7,080,078 B1 | 7/2006 | Slaughter et al. |
| (Continued) | | |

FOREIGN PATENT DOCUMENTS

| CN | 1764880 | 4/2006 |
| CN | 101075316 | 11/2007 |
| (Continued) | | |

OTHER PUBLICATIONS

JP2017-515973 received an Office Action dated Feb. 12, 2019, 6 pages.
(Continued)

*Primary Examiner* — Edward Zee
(74) *Attorney, Agent, or Firm* — Kilpatrick Townsend & Stockton LLP

(57) ABSTRACT

The present disclosure relates generally to managing access to an enterprise system using remote devices. Techniques are disclosed for provisioning applications on remote devices to access resources in an enterprise system. Specifically, applications may be automatically configured with access information (e.g., account information) and connection information to access a resource in an enterprise system using a remote device. Configuring an application may include determining an account for accessing a resource using the application. An account may be provisioned if one has not been established. Upon configuring an application, the device access management system may provide a configured application to the remote device(s) for which the application is configured. Once the configured application is received, the application may be automatically installed on the remote
(Continued)

device, after which the application may be executed to access a resource.

20 Claims, 13 Drawing Sheets

Related U.S. Application Data continuation of application No. 14/690,062, filed on Apr. 17, 2015, now Pat. No. 9,692,748.

(60) Provisional application No. 62/054,544, filed on Sep. 24, 2014.

(51) Int. Cl.

| | | |
|---|---|---|
| *G06F 8/60* | (2018.01) | |
| *G06F 8/61* | (2018.01) | |
| *G06F 8/71* | (2018.01) | |
| *G06F 21/45* | (2013.01) | |
| *G06F 21/30* | (2013.01) | |
| *H04W 4/50* | (2018.01) | |
| *H04W 4/60* | (2018.01) | |
| *H04L 29/08* | (2006.01) | |
| *H04L 29/06* | (2006.01) | |
| *H04W 4/08* | (2009.01) | |
| *H04W 4/70* | (2018.01) | |
| *H04L 12/24* | (2006.01) | |
| *G06F 21/31* | (2013.01) | |
| *H04L 9/32* | (2006.01) | |
| *H04W 28/08* | (2009.01) | |
| *H04L 12/803* | (2013.01) | |
| *H04W 16/06* | (2009.01) | |
| *G06F 8/65* | (2018.01) | |
| *G06F 21/12* | (2013.01) | |
| *G06F 9/44* | (2018.01) | |
| *G06F 9/451* | (2018.01) | |

(52) U.S. Cl.
CPC .............. *G06F 8/71* (2013.01); *G06F 21/121* (2013.01); *G06F 21/30* (2013.01); *G06F 21/31* (2013.01); *G06F 21/45* (2013.01); *H04L 9/3268* (2013.01); *H04L 41/20* (2013.01); *H04L 41/28* (2013.01); *H04L 41/5096* (2013.01); *H04L 47/125* (2013.01); *H04L 63/08* (2013.01); *H04L 63/083* (2013.01); *H04L 63/0823* (2013.01); *H04L 63/0876* (2013.01); *H04L 63/10* (2013.01); *H04L 63/101* (2013.01); *H04L 63/102* (2013.01); *H04L 63/104* (2013.01); *H04L 63/105* (2013.01); *H04L 63/20* (2013.01); *H04L 63/205* (2013.01); *H04L 67/02* (2013.01); *H04L 67/10* (2013.01); *H04L 67/12* (2013.01); *H04L 67/26* (2013.01); *H04L 67/306* (2013.01); *H04L 67/36* (2013.01); *H04W 4/08* (2013.01); *H04W 4/50* (2018.02); *H04W 4/60* (2018.02); *H04W 4/70* (2018.02); *H04W 16/06* (2013.01); *H04W 28/08* (2013.01); *G06F 9/4445* (2013.01); *G06F 9/452* (2018.02); *H04L 41/082* (2013.01)

(56) References Cited

U.S. PATENT DOCUMENTS

| | | |
|---|---|---|
| 7,620,001 B2 | 11/2009 | Ganji |
| 7,707,643 B2 | 4/2010 | DeMello et al. |
| 7,711,796 B2 | 5/2010 | Gutt et al. |
| 7,746,851 B2 | 6/2010 | Chandrasiri et al. |
| 7,886,033 B2 | 2/2011 | Hopmann et al. |
| 7,894,458 B2 | 2/2011 | Jiang et al. |
| 7,925,729 B2 | 4/2011 | Bush et al. |
| 8,086,233 B2 | 12/2011 | Millet et al. |
| 8,103,763 B2 | 1/2012 | Slepov et al. |
| 8,281,010 B2 | 10/2012 | Ansari et al. |
| 8,359,016 B2 | 1/2013 | Lindeman et al. |
| 8,369,326 B2 | 2/2013 | Ansari et al. |
| 8,548,452 B2 | 10/2013 | Coskun et al. |
| 8,572,676 B2 | 10/2013 | Sapp et al. |
| 8,583,683 B2 | 11/2013 | Rathod |
| 8,595,186 B1 | 11/2013 | Mandyam et al. |
| 8,615,581 B2 | 12/2013 | Dare et al. |
| 8,650,290 B2 | 2/2014 | Dare et al. |
| 8,688,147 B2 | 4/2014 | Nguyen et al. |
| 8,769,270 B2 | 7/2014 | Orsini et al. |
| 8,812,685 B2 | 8/2014 | Fuller |
| 8,839,234 B1 | 9/2014 | Voronkov et al. |
| 8,856,289 B2 | 10/2014 | Ansari et al. |
| 8,935,275 B2 | 1/2015 | Rathod |
| 9,077,733 B2 | 7/2015 | Kazan et al. |
| 9,094,309 B2 | 7/2015 | Branch et al. |
| 9,106,661 B1 | 8/2015 | Stamos |
| 9,210,183 B2 | 12/2015 | Sadovsky et al. |
| 9,270,492 B2 | 2/2016 | Ansari et al. |
| 9,535,675 B2 | 1/2017 | Mohamad Abdul et al. |
| 9,652,212 B2 | 5/2017 | Jayanti Venkata et al. |
| 9,692,748 B2 | 6/2017 | Maheshwari et al. |
| 9,729,542 B2 | 8/2017 | Jayanti Venkata et al. |
| 9,749,311 B2 | 8/2017 | Jayanti Venkata et al. |
| 9,781,098 B2 | 10/2017 | Mohamad Abdul et al. |
| 9,813,407 B2 | 11/2017 | Mohamad Abdul et al. |
| 9,882,726 B2 | 1/2018 | Ma et al. |
| 10,075,429 B2 | 9/2018 | Jayanti Venkata et al. |
| 10,116,647 B2 | 10/2018 | Maheshwari et al. |
| 10,129,109 B2 | 11/2018 | Jayanti Venkata et al. |
| 10,142,327 B2 | 11/2018 | Mohamad Abdul et al. |
| 2004/0054676 A1 | 3/2004 | McNally et al. |
| 2004/0268148 A1 | 12/2004 | Karjala et al. |
| 2005/0021567 A1 | 1/2005 | Holenstein et al. |
| 2005/0125509 A1 | 6/2005 | Ramachandran |
| 2005/0203673 A1 | 9/2005 | El-Hajj et al. |
| 2006/0048142 A1 | 3/2006 | Roese et al. |
| 2007/0055752 A1 | 3/2007 | Wiegand et al. |
| 2007/0093243 A1 | 4/2007 | Kapadekar et al. |
| 2007/0243862 A1 | 10/2007 | Coskun et al. |
| 2008/0059631 A1 | 3/2008 | Bergstrom et al. |
| 2008/0065604 A1 | 3/2008 | Tiu et al. |
| 2008/0168072 A1 | 7/2008 | Freedman |
| 2009/0254392 A1 | 10/2009 | Zander |
| 2009/0265701 A1 | 10/2009 | Naslavsky et al. |
| 2009/0287818 A1 | 11/2009 | Tachibana et al. |
| 2009/0300742 A1 | 12/2009 | Ahn |
| 2010/0114618 A1 | 5/2010 | Wilcock et al. |
| 2010/0174783 A1 | 7/2010 | Zarom |
| 2010/0185263 A1 | 7/2010 | Stevenson et al. |
| 2010/0262619 A1 | 10/2010 | Zargahi et al. |
| 2011/0010340 A1 | 1/2011 | Hung et al. |
| 2011/0282836 A1 | 11/2011 | Erickson et al. |
| 2012/0079026 A1 | 3/2012 | Tiu, Jr. et al. |
| 2012/0084184 A1 | 4/2012 | Raleigh et al. |
| 2012/0106399 A1 | 5/2012 | Abendroth et al. |
| 2012/0129503 A1 | 5/2012 | Lindeman et al. |
| 2012/0131327 A1 | 5/2012 | Tomlinson |
| 2012/0179802 A1 | 7/2012 | Narasimhan et al. |
| 2012/0240232 A1 | 9/2012 | Azuma |
| 2012/0274864 A1 | 11/2012 | King |
| 2012/0278454 A1 | 11/2012 | Stewart et al. |
| 2012/0297444 A1 | 11/2012 | Kacherov et al. |
| 2013/0013777 A1 | 1/2013 | Krywaniuk |
| 2013/0204948 A1 | 8/2013 | Zeyliger et al. |
| 2013/0219307 A1 | 8/2013 | Raber et al. |
| 2013/0247028 A1 | 9/2013 | Brooks et al. |
| 2013/0254834 A1 | 9/2013 | King |
| 2013/0262626 A1 | 10/2013 | Bozek et al. |
| 2014/0006347 A1 | 1/2014 | Qureshi et al. |
| 2014/0007084 A1 | 1/2014 | Ding |
| 2014/0007182 A1 | 1/2014 | Qureshi et al. |

(56) References Cited

U.S. PATENT DOCUMENTS

| | | |
|---|---|---|
| 2014/0007183 A1 | 1/2014 | Qureshi et al. |
| 2014/0007214 A1 | 1/2014 | Qureshi et al. |
| 2014/0032759 A1 | 1/2014 | Barton et al. |
| 2014/0040975 A1 | 2/2014 | Raleigh et al. |
| 2014/0059642 A1 | 2/2014 | Deasy et al. |
| 2014/0068030 A1 | 3/2014 | Chambers et al. |
| 2014/0082196 A1 | 3/2014 | Harrison et al. |
| 2014/0100676 A1 | 4/2014 | Scott et al. |
| 2014/0108801 A1 | 4/2014 | McBride et al. |
| 2014/0113593 A1 | 4/2014 | Zhou et al. |
| 2014/0162614 A1 | 6/2014 | Lindeman et al. |
| 2014/0172799 A1 | 6/2014 | Dorman |
| 2014/0199962 A1 | 7/2014 | Mohammed et al. |
| 2014/0207220 A1 | 7/2014 | Boling et al. |
| 2014/0229599 A1 | 8/2014 | Petrick |
| 2014/0258970 A1 | 9/2014 | Brown et al. |
| 2014/0259178 A1 | 9/2014 | Karaa et al. |
| 2014/0280815 A1 | 9/2014 | Candelaria et al. |
| 2014/0298324 A1* | 10/2014 | Voronkov ............ G06F 21/629 717/178 |
| 2014/0337528 A1 | 11/2014 | Barton et al. |
| 2014/0337862 A1 | 11/2014 | Valencia et al. |
| 2014/0359098 A1 | 12/2014 | Xu |
| 2015/0009533 A1 | 1/2015 | Anno et al. |
| 2015/0067135 A1 | 3/2015 | Wang et al. |
| 2015/0070585 A1 | 3/2015 | Sharif-Ahmadi et al. |
| 2015/0135060 A1 | 5/2015 | Taylor et al. |
| 2015/0156122 A1 | 6/2015 | Singh et al. |
| 2015/0161386 A1 | 6/2015 | Gupta et al. |
| 2015/0170585 A1 | 6/2015 | Jeong et al. |
| 2015/0205669 A1 | 7/2015 | Sundaram et al. |
| 2015/0249684 A1 | 9/2015 | Zhang et al. |
| 2015/0278245 A1 | 10/2015 | Sagar et al. |
| 2015/0281087 A1 | 10/2015 | Jalan et al. |
| 2015/0302338 A1 | 10/2015 | Zaveri |
| 2015/0304891 A1 | 10/2015 | Dinan |
| 2015/0356462 A1 | 12/2015 | Fawaz et al. |
| 2016/0085533 A1 | 3/2016 | Jayanti Venkata et al. |
| 2016/0087854 A1 | 3/2016 | Jayanti Venkata et al. |
| 2016/0087955 A1 | 3/2016 | Mohamad Abdul et al. |
| 2016/0087956 A1 | 3/2016 | Maheshwari et al. |
| 2016/0088021 A1 | 3/2016 | Jayanti Venkata et al. |
| 2016/0088026 A1 | 3/2016 | Mohamad Abdul et al. |
| 2016/0199658 A1 | 7/2016 | Nassif et al. |
| 2017/0063846 A1 | 3/2017 | Mohamad Abdul et al. |
| 2017/0207985 A1 | 7/2017 | Jayanti Venkata et al. |
| 2017/0257362 A1 | 9/2017 | Maheshwari et al. |
| 2017/0364225 A1 | 12/2017 | Hammack et al. |
| 2017/0374061 A1 | 12/2017 | Jayanti Venkata et al. |
| 2018/0034808 A1 | 2/2018 | Mohamad Abdul et al. |

FOREIGN PATENT DOCUMENTS

| | | |
|---|---|---|
| CN | 101305347 | 11/2008 |
| CN | 101345757 | 1/2009 |
| CN | 101356520 | 1/2009 |
| CN | 101651743 A | 2/2010 |
| CN | 101989197 | 3/2011 |
| CN | 102239482 | 11/2011 |
| CN | 102281286 | 12/2011 |
| CN | 102984209 | 3/2013 |
| CN | 103403707 | 11/2013 |
| CN | 103597447 | 2/2014 |
| CN | 103608778 | 2/2014 |
| CN | 103703741 | 4/2014 |
| CN | 104321746 | 1/2015 |
| CN | 106605210 | 4/2017 |
| CN | 106664323 | 5/2017 |
| CN | 107113326 | 8/2017 |
| CN | 107431721 | 12/2017 |
| CN | 106605210 B | 1/2019 |
| EP | 2282477 | 2/2011 |
| EP | 2676497 | 12/2013 |
| EP | 2716086 | 4/2014 |
| EP | 2757471 | 7/2014 |
| EP | 2759154 | 7/2014 |
| EP | 3198421 | 8/2017 |
| EP | 3198419 | 2/2018 |
| EP | 3198422 | 4/2018 |
| JP | 2004062417 | 2/2004 |
| JP | 2009238191 | 10/2009 |
| JP | 2010128824 | 6/2010 |
| JP | 2014503926 A | 1/2012 |
| JP | 2012083880 | 4/2012 |
| JP | 2012198659 | 10/2012 |
| JP | 2015523669 | 8/2015 |
| JP | 2015526951 | 9/2015 |
| JP | 2016522472 | 7/2016 |
| JP | 2017528844 | 9/2017 |
| JP | 2017529627 | 10/2017 |
| JP | 2017534104 | 11/2017 |
| JP | 2017536598 | 12/2017 |
| JP | 6417035 B2 | 10/2018 |
| JP | 6474890 | 2/2019 |
| JP | 6499281 | 3/2019 |
| KR | 1020170063757 | 6/2017 |
| KR | 1020170063788 | 6/2017 |
| KR | 1020170063792 | 6/2017 |
| WO | 2008016580 | 2/2008 |
| WO | 2009001447 | 12/2008 |
| WO | 2011123328 | 10/2011 |
| WO | 2012109751 | 8/2012 |
| WO | 2012164287 | 12/2012 |
| WO | 2013041849 | 3/2013 |
| WO | 2014032051 | 2/2014 |
| WO | 2014036296 | 3/2014 |
| WO | 2014047168 | 3/2014 |
| WO | 2014158227 | 10/2014 |
| WO | 2016048414 | 3/2016 |
| WO | 2016048415 | 3/2016 |
| WO | 2016048416 | 3/2016 |
| WO | 2016048417 | 3/2016 |

OTHER PUBLICATIONS

JP2017-516125 received a Notice of Allowance dated Feb. 19, 2019, 6 pages.
Chinese Application No. 201580045976.3, Office Action dated Jun. 19, 2018, 7 pages (3 pages of Original Document and 4 pages of English Translation).
European Patent Application No. 15721404.0, Office Action dated Sep. 6, 2017, 7 pages.
Japanese Application No. 2017-516125, Office Action dated Nov. 6, 2018, 7 pages (4 pages of Original Document and 3 pages of English Translation).
Chinese Application No. 201580045294.2, Office Action, dated Aug. 5, 2020, 6 pages (3 pages for the original document and 3 pages for the English translation).
Chinese Application No. 201580045296.1, Office Action dated Aug. 20, 2019, 22 pages (9 pages of Original Document and 13 pages of English Translation).
Chinese Application No. 201580045296.1, Office Action dated Apr. 3, 2020, 7 pages (3 pages of Original Document and 4 pages of English Translation).
Japanese Application No. 2017-515973, Office Action dated May 28, 2019, 2 pages.
Japanese Application No. 2017-514681, Notice of Decision to Grant dated Jan. 8, 2019, 6 pages (3 pages for the original document and 3 pages for the English translation).
Chinese Application No. CN202010319947.4, Search Report dated Oct. 21, 2020, 2 pages.
Indian Application No. IN201647045093, First Examination Report dated Oct. 14, 2020, 8 pages.
Can You Pre-configure an App Before Deployment?, Enterprise iOS Forums, Available online at: http://www.enterpriseios.com/forum/topic/Can_you_pre_configure_an_app_before_deployment, Jan. 25, 2013, 2 pages.
Complete Mobility Management Solutions for Samsung SAFE and KNOX Devices, Samsung for Enterprise (SAFE) Management,

(56) References Cited

OTHER PUBLICATIONS

Available online at: http://www.air-watch.com/solutions/android/samsung-for-enterprise/, Mar. 23, 2015, 3 pages.
Complete Mobility Management Solutions of Apple iOS, Apple iOS Device Management, Available online at: http://www.air-watch.com/solutions/apple-ios/, Mar. 23, 2015, 4 pages.
Comprehensive App Security, Management and Deployment, AirWatch Mobile Application Management, Available online at: http://www.air-watch.com/solutions/mobile-application-management/, Mar. 23, 2015, 5 pages.
Comprehensive Security, Management and User Enablement for Android, AirWatch for Android Devices, Available online at: http://www.air-watch.com/solutions/android/, Mar. 23, 2015, 2 pages.
Configure and Enforce Policies Across Compatible Ironkey Secure USB Mobile Storage Devices, Access Management Software, Available online at: http://www.ironkey.com/en-US/access-enterprise/, Mar. 23, 2015, 3 pages.
Flexible Containerization for Your Mobile Deployment, AirWatch Workspace Management, Available online at: http://www.air-watch.com/solutions/container/, Mar. 24, 2015, 2 pages.
Manage Mobile Devices with Configuration Manager and Microsoft Intune, Available online at: https://technet.microsoft.com/en-us/library/jj884158.aspx, Mar. 3, 2015, 4 pages.
Mobile Device Management for iOS, Android & Windows Phone, Mobile device management, Available online at: https://www.manageengine.com/products/desktop-central/mobile-device-management-mdm.html, Mar. 25, 2015, 4 pages.
StackOverflow-iphone Plist, Available online at: http://stackoverflow.com/guestions/1756636/what-is-the-use-of-plist, 2009, 2 pages.
U.S. Appl. No. 14/689,722, Final Office Action dated Dec. 15, 2016, 25 pages.
U.S. Appl. No. 14/689,722, Non-Final Office Action dated Jun. 7, 2016, 20 pages.
U.S. Appl. No. 14/689,722, Notice of Allowance dated May 5, 2017, 20 pages.
U.S. Appl. No. 14/689,733, Non-Final Office Action dated Jun. 2, 2016, 6 pages.
U.S. Appl. No. 14/689,733, Notice of Allowance dated Aug. 29, 2016, 11 pages.
U.S. Appl. No. 14/689,983, Non-Final Office Action dated Dec. 9, 2016, 5 pages.
U.S. Appl. No. 14/690,034, Final Office Action dated Sep. 16, 2016, 12 pages.
U.S. Appl. No. 14/690,034, Non-Final Office Action dated May 19, 2016, 15 pages.
U.S. Appl. No. 14/690,034, Notice of Allowance dated Jan. 5, 2017, 7 pages.
U.S. Appl. No. 14/690,045, Ex-Parte Quayle Action mailed on Feb. 24, 2017, 8 pages.
U.S. Appl. No. 14/690,045, Notice of Allowance dated Apr. 26, 2017, 5 pages.
U.S. Appl. No. 14/690,062, Non-Final Office Action dated Nov. 10, 2016, 5 pages.
U.S. Appl. No. 14/690,062, Notice of Allowance dated Feb. 23, 2017, 8 pages.
U.S. Appl. No. 15/347,152, Non-Final Office Action dated Feb. 27, 2017, 7 pages.
U.S. Appl. No. 15/347,152, Notice of Allowance dated Jun. 29, 2017, 5 pages.
U.S. Appl. No. 15/476,906, Non-Final Office Action dated Jan. 19, 2018, 13 pages.
U.S. Appl. No. 15/476,906, Notice of Allowance dated Jun. 5, 2018, 8 pages.
U.S. Appl. No. 15/601,832, Non-Final Office Action dated Feb. 26, 2018, 8 pages.
U.S. Appl. No. 15/601,832, Notice of Allowance dated Jun. 27, 2018, 8 pages.
U.S. Appl. No. 15/684,142, Non-Final Office Action dated Dec. 28, 2017, 12 pages.
U.S. Appl. No. 15/684,142, Notice of Allowance dated May 18, 2018, 8 pages.
U.S. Appl. No. 15/787,935, Non-Final Office Action dated Feb. 27, 2018, 9 pages.
U.S. Appl. No. 15/787,935, Notice of Allowance dated Jul. 19, 2018, 7 pages.
Chanliau, Extending Enterprise Access and Governance with Oracle Mobile Security, Oracle Fusion Middleware, An Oracle White Paper, Mar. 2014, 29 pges.
Chinese Application No. 201580045976.3, Office Action dated Jan. 23, 2018, 10 pages (5 pages of Original Document and 5 pages of English Translation).
European Application No. EP15721408.1, Office Action dated Oct. 17, 2018, 9 pages.
Firtman, Chapter 12 Widgets and Offline Webapps, Programming the Mobile Web, Publisher: O'Reilly Media, p. 398, 2010, 4 pages.
Japanese Application No. 2017-514681, Office Action dated Sep. 11, 2018, 3 pages (2 pages of Original Document and 1 pages of English Translation).
Japanese Application No. 2017-516071, Office Action dated Aug. 7, 2018, 3 pages (2 pages of Original Document and 1 pages of English Translation).
International Application No. PCT/US2015/026594, International Preliminary Report on Patentability dated Apr. 6, 2017, 13 pages.
International Application No. PCT/US2015/026594, International Search Report and Written Opinion dated Aug. 10, 2015, 15 pages.
International Application No. PCT/US2015/026596, International Preliminary Report on Patentability dated Nov. 22, 2016, 11 pages.
International Application No. PCT/US2015/026596, International Search Report and Written Opinion dated Aug. 14, 2015, 12 pages.
International Application No. PCT/US2015/026596, Written Opinion dated Aug. 22, 2016, 7 pages.
International Application No. PCT/US2015/026697, International Preliminary Report on Patentability dated Sep. 2, 2016, 10 pages.
International Application No. PCT/US2015/026697, International Search Report and Written Opinion dated Jul. 24, 2015, 11 pages.
International Application No. PCT/US2015/026697, Written Opinion dated Apr. 4, 2016, 8 pages.
International Application No. PCT/US2015/026699, International Preliminary Report on Patentability dated Nov. 10, 2016, 9 pages.
International Application No. PCT/US2015/026699, International Search Report and Written Opinion dated Aug. 6, 2015, 11 pages.
Chinese Application No. 201580045294.2, Office Action dated Nov. 22, 2019, 18 pages (9 pages for the original document and 9 pages for the English translation).
Chinese Application No. 201580047019.4, Office Action dated Oct. 29, 2019, 14 pages (6 pages for the original document and 8 pages for the English translation).
European Application No. 15721407.3, Office Action dated Sep. 10, 2019, 7 pages.
Japanese Application No. 2017-515973, Notice of Decision to Grant dated Dec. 17, 2019, 3 pages.
Chinese Application No. 202010319947.4, Office Action, dated Oct. 29, 2020, 18 pages (9 pages of Original Document and 9 pages of English Translation).
Korean Application No. 10-2017-7010733, Office Action dated Feb. 26, 2021, 3 pages of English Translation, 2 pages Original Document.
Korean Application No. 10-2017-7011021, Office Action dated Feb. 26, 2021, 4 pages, no English Translation Available.
Korean Application No. 10-2017-7011062, Office Action dated Feb. 26, 2021, 2 pages of English Translation, 4 pages Original Document.
Chinese Application No. CN202010319947.4 received a Notice of Decision to Grant, dated Apr. 14, 2021, 5 pages.
Indian Application No. 201647045092, First Examination Report dated Feb. 10, 2021, 8 pages.
Chinese Application No. 202010940313.0, Office Action dated Apr. 6, 2021, 12 pages. (6 pages of Original Document and 6 pages of English Translation).
Chinese Application No. CN201580045294.2, Notice of Allowance dated May 8, 2021. No English Translation Available.

(56) References Cited

OTHER PUBLICATIONS

Korean Application No. KR10-2017-7011005 received a Notice of Office Action dated May 17, 2021, 19 pages (9 pages Original Document and 10 pages English Translation).

* cited by examiner

| User Roles 512 | Permitted Resources 514 |
|---|---|
| Administrator | -VPN Service<br>-Outlook Email Service<br>-Human Resources Service |
| Executive | -Outlook Email Service<br>-Human Resources Service |
| Employee | -Outlook Email Service |

FIG. 5

| Application(s) 612 | Resource(s) 614 | Connection Information 616 |
|---|---|---|
| Email Application | Outlook Email Service | - Port Address Email Service System<br>- Host Address Email Service System<br>- LDAP of Email Service System |
| VPN Application | VPN Service | - Port Address VPN Service System<br>- Host Address VPN Service System |
| Human Resources (HR) Application | HR Service | - Port Address HR Service System<br>- Host Address HR Service System |

FIG. 6

| Application Configuration(s) 812 | Access Information 814 | User Roles 816 | Connection Information 818 |
|---|---|---|---|
| Email Application - Configured | User_ID (Email Service) | Executive | - Port Address Email Service System<br>- Host Address Email Service System<br>- LDAP of Email Service System |
| VPN Application - Removed | None | Executive | None |

*FIG. 8*

UNIFIED PROVISIONING OF APPLICATIONS ON DEVICES IN AN ENTERPRISE SYSTEM

CROSS-REFERENCES TO RELATED APPLICATIONS

This application is a continuation of, and claims benefit and priority to U.S. patent application Ser. No. 15/601,832, filed May 22, 2017, entitled "UNIFIED PROVISIONING OF APPLICATIONS ON DEVICES IN AN ENTERPRISE SYSTEM", which is a continuation of, and claims benefit and priority to U.S. application Ser. No. 14/690,062, filed Apr. 17, 2015, entitled "UNIFIED PROVISIONING OF APPLICATIONS ON DEVICES IN AN ENTERPRISE SYSTEM", now U.S. Pat. No. 9,692,748, which claims the benefit and priority of U.S. Application No. 62/054,544, filed Sep. 24, 2014, entitled "MOBILE SECURITY MANAGER (MSM)". The entire contents of each of the above-identified patent applications are incorporated herein by reference in their entirety for all purposes.

BACKGROUND

The present disclosure relates generally to managing access to an enterprise system using remote devices. More particularly, techniques are disclosed for unifying management of remote devices and user identities for enabling access to an enterprise system. Techniques are disclosed for managing provisioning of applications on remote devices to access resources in an enterprise system.

With the proliferation of devices including mobile devices, many enterprises are adopting a "bring your own device" (BYOD) policy. BYOD enables users to bring their own devices to connect to an enterprise's system to access resources (e.g., applications or data) provided by the enterprise. A BYOD policy may permit users to continue use of their own devices for personal use. Managing different uses (e.g., personal use and corporate use) of user-owned devices in an enterprise system becomes a paramount concern for an enterprise. Permitting user-owned devices to access an enterprise system can present new security risks. Once access to an enterprise system is obtained by a user-owned device, the enterprise system may be exposed to security risks from non-compliant devices and non-compliant use of devices. Enterprise systems may be challenged to find ways to separate personal data from enterprise data on user-owned devices. User-owned devices may contain personal information and have special privacy considerations. Many user-owned devices may lack enterprise security controls to enable integration of those devices into an enterprise system. Security becomes an even greater concern when user-owned devices are compromised (e.g., hacked, stolen, or lost). Enterprises are searching for new and improved ways to integrate user-owned devices with the enterprise identity governance and access control infrastructure for security and compliance reasons.

To facilitate management of user-owned devices and corporate devices that access an enterprise system, some enterprises may implement a mobile device management (MDM) system and/or a mobile application management (MAM) system. Such systems may facilitate management and control of access to an enterprise system to ensure an enterprise system and its resources are secured. Management and control of access to an enterprise system may include communicating information about compliance and resources, and actions that must be taken for maintaining access to the enterprise system.

An enterprise having thousands of users (e.g., employees, contractors, and customers) may be faced with the task of managing access and compliance for thousands of devices that access the enterprise. Users may operate different devices and may have different roles for accessing an enterprise system. Many users may be burdened with managing access and compliance for an enterprise system, which often times may be complex. To complicate matters further, users may have registered different types of devices, some of which may need to be configured differently for an application. For example, an application may be configured differently based on a type of a device and/or a platform (e.g., operating system) supporting the application. For users that operate multiple devices, these users may be challenged with keeping track of the different factors that affect the configuration of an application to access a resource in an enterprise system. Enterprises may have a difficult time to get users to comply with their policies and to configure application for accessing resources provided by those enterprises. To further complicate matters, users may operate devices differently with respect to personal use, such that enterprises are challenged with ways to ensure that each device associated with a user is able to access resources provided by the enterprise.

As a result of the complexities of managing devices that access an enterprise system, enterprises and users accessing resources provided by the enterprises are unable to routinely manage the configuration of applications. To ensure that access to an enterprise system is not compromised, an enterprise may completely restrict or inhibit access to an enterprise system when a configuration of an application to access to a resource has changed. Such change may be brought on by a change in a user's role or a change in a policy (e.g., an access policy or a compliance policy) for accessing an enterprise. Some applications may need to be manually configured for compliance. As a result, users may be burdened with having to individually adjust a configuration of their applications on each of their devices. Enterprises are searching for ways to manage a configuration of the applications that enable devices to access resources in an enterprise system.

BRIEF SUMMARY

The present disclosure relates generally to managing access to an enterprise system using remote devices. More particularly, techniques are disclosed for unifying management of remote devices and user identities for enabling access to an enterprise system. Techniques are disclosed for provisioning applications on remote devices to access resources in an enterprise system. Specifically, applications may be automatically configured with access information (e.g., account information) and connection information to access a resource in an enterprise system using a remote device. A configured application may enable a user of a remote device to access a resource without having to manually configure the application to access the resource.

In some embodiments, a device access management system may be implemented to configure an application to access a resource using a remote device. An application may be automatically configured for any number of reasons including registration of a remote device for a user, receiving a request to access a resource, discovering that access has been granted to a new resource, or discovering of a new application. Configuring an application may include determining an account for accessing a resource using the application. An account may be determined for a user associated with the remote device for which an application is to be configured. Based on a role of the user, an account may be provisioned to access a resource if an account is not already provisioned for the resource. In some embodiments, access to a resource may vary based on the role of a user. By determining an account of a user, the user is not burdened by an additional process of retrieving account information or requesting an account before configuring an application to access a resource.

The device access management system may automatically configure an application to reduce or eliminate a process by which a user may have to configure an application. Often times, remote devices may vary in their attributes (e.g., type of device and platform of the device), such that configuring an application may involve different process depending on the attributes of a device. A user may be unfamiliar with the different processes for configuring an application. For a user having several remote devices, the user may be burdened by having to configure an application on each of those remote devices. An enterprise may be equally burdened with having to provide a mechanism to ensure an application can be configured properly on each of the remote devices registered for a user. The device access management system may automatically configure the application with at least access information (e.g., account information) and connection information (e.g., a port address, a host address, or a data access protocol) for each of the remote devices registered for a user. In some embodiments, one or more settings related to a feature of an application may be configured. The setting(s) may be configured based on a role of a user or preferences of the user. Once an application is configured, the application may be executed to access a resource. A user may have to provide confidential access information (e.g., a password) to access a resource using an application that has been configured. Neither the user nor the enterprise may have to manually configure an application to access a resource.

Upon configuring an application, the device access management system may transmit a configured application to the remote device(s) for which the application is configured. In some embodiments, the configured application may be transmitted to a remote device using a push notification service. Once the configured application is received, the application may be automatically installed on the remote device, after which the application may be executed to access a resource. In some embodiments, a configured application may be stored in a data store (e.g., an application catalog), where a remote device can access and/or retrieve the application. The remote device may receive a notification of the availability of the application in the data store. In some embodiments, a configuration of an application rather than a configured application may be transmitted to a remote device. The remote device may configure the application based on the received configuration.

An application may be configured for multiple remote devices, which may be registered to different users. Where an application may be configured similarly for multiple remote devices registered for a user, the device access management system may transmit the application to each of those remote devices. By configuring applications for users, an enterprise can ensure that remote devices are provided with a current application without a user having to take steps to identify and obtain the application for each of those remote devices. Configuring the application for multiple devices may improve processing efficiency for distribution of an application by reducing the overall number of requests for the application to an enterprise system.

Upon discovering a change in access to a resource in an enterprise system, the device access management system may automatically modify a configuration of an application that provides access to the resource. A change in access may be caused by any number of change events including, without limitation, a change in a user role of one or more users, an update to an application, a change in compliance with a policy, and a change in a configuration of a remote device. Based on the change, the device access management system may modify a configuration of an application for one or more remote devices affected by the change. For example, when access to a resource is revoked, a configuration of an application may be modified to delete the configuration. In some embodiments, the device access management system may transmit an instruction to a remote device affected by the change. The instruction, upon its receipt, may cause the remote device to modify a configuration of an application based on the change in access. When access to a resource is revoked, the instruction may direct a remote device to remove an application that provides access to the resource. Upon discovering that access to a new resource is granted, an application may be configured for remote devices registered to users that are permitted to access the discovered resource. The newly configured application may be transmitted to those remote devices permitted to install the configured application.

Some embodiments of the present invention may be implemented by a computing system. The computing system may be implemented as part of a device access management system. The computing system may implement methods and operations. In at least one embodiment, the computing system may include one or more processors and a memory storing instructions that, when executed by the one or more processors, cause the one or more processors to implement operations. The operations may be implemented to perform a method. In some embodiments, a non-transitory computer-readable medium may comprise instructions, that when executed by one or more processors, causes operations to be performed. In some embodiments, a non-transitory computer-readable medium may protect a computer from an electronic communication containing malicious code. In one example, instructions stored on a computer-readable medium, when executed by one or more processors, may cause the methods and operations described below to be implemented. Yet other embodiments relate to systems and machine-readable tangible storage media which employ or store instructions for the methods and the operations described below.

In at least one embodiment, a method may be implemented by the computer system. The method may include identifying a user role associated with an identity for a user of an enterprise system. The method may include retrieving device information of a first remote device registered for the identity to access the enterprise system. The method may include determining, based on the user role, an account providing the identity with access to a first resource accessible in the enterprise system. The first resource may be accessible from the first remote device using a first application of a plurality of applications accessible to the user role. The method may include configuring the first application to access the first resource for the account using the first remote device. The first application may be configured with connection information to connect to a first target system that provides the first resource. The first application may be configured with access information to access the first resource for the account. The method may include transmitting the first application to the first remote device upon configuration of the first application.

In some embodiments, the device information indicates a configuration of the first remote device, the configuration indicating an operating system configuration on the first remote device and a hardware configuration of the first remote device. The first application may be configured using the configuration of the first remote device.

In some embodiments, the connection information includes a port address of the first target system, a host address of the first target system, and a lightweight directory access protocol (LDAP) of the first target system.

In some embodiments, the method may include detecting a second remote device of a plurality of remote devices registered for the identity to access the enterprise system. The method may include transmitting the first application to the second remote device upon configuration of the first application.

In some embodiments, the method may include detecting a change in the user role from a first user role to a second user role. The method may include determining a change in access by the identity to the first resource based on the second user role. The change in access to the first resource may include revoking access to the first resource. Modifying the first application includes deleting the connection information and the access information configured for the first application. Modifying the first application may include removing the first application from the first remote device. Modifying the first application may include adjusting the access information configured for the first application. The method may include instructing the first remote device to modify a configuration of the first application based on the change in access. In at least one embodiment, the method may include discovering a plurality of remote devices registered for the identity to access the enterprise system. The method may include transmitting the first application to the plurality of remote devices upon configuration of the first application. The method may include instructing each of the plurality of remote devices to modify a configuration of the first application based on the change in access.

In some embodiments, the method may include detecting a change in the user role from a first user role to a second user role. The method may include discovering, based on the second user role, a second application of the plurality of applications accessible to the second user role. The method may include configuring the second application for access from the first remote device using the identity. The second application may be configured with information to access a second resource provided by a second target system. The method may include transmitting the second application to the first remote device.

In some embodiments, the method may include identifying, based on the user role, a second application of the plurality of applications, the second application enabling the user to perform the user role. The method may include provisioning the second application to access a second resource in the enterprise system. The method may include configuring the second application to access the second resource from the first remote device. The method may include transmitting the second application upon configuration of the second application.

In some embodiments, determining the account includes: determining whether the account is provisioned for accessing the first resource of the first target system; provisioning the account to provide the identity with access to the first resource of the first target system upon determining that the account is not provisioned for accessing the first resource; and retrieving account information about the account upon determining that the account is provisioned for the identity.

In at least one embodiment, another method may be implemented by the computer system. The method may include identifying a user role associated with an identity for a user of an enterprise system. The method may include retrieving device information of a plurality of remote devices registered for the identity to access the enterprise system. The method may include determining, based on the user role, an account providing the identity with access to a first resource accessible in the enterprise system. The first resource may be accessible from the plurality of remote devices using a first application of a plurality of applications accessible to the user role. The method may include configuring the first application to access the first resource for the account using the plurality of remote devices. The first application may be configured with connection information to connect to a first target system that provides the first resource. The first application may be configured with access information to access the first resource for the account. The method may include transmitting the first application to each of the plurality of remote devices upon configuration of the first application. In some embodiments, configuring the first application may include configuring an instance of the first application for each of the plurality of remote devices. The instance of the first application may be configured for a remote device based on a configuration of the remote device. The configuration of the remote device may include one or both of a device configuration or an operating system configuration of the remote device. The instance of the first application may be configured differently for each of a first remote device and a second remote device of the plurality of remote devices. A configuration of the first remote device may be different from a configuration of the second remote device.

In at least one embodiment, another method may be implemented by the computer system. The method may include identifying a user role associated with an identity for a user of an enterprise system. The method may include retrieving device information of a first remote device registered for the identity to access the enterprise system. The method may include provisioning, based on the user role, access for the identity to a plurality of applications. Each of the plurality of applications may be provisioned for access to a different resource in the enterprise system using the first remote device. The method may include configuring a first application of the plurality of applications with first connection information and first access information to access a first resource from the first remote device. The method may include configuring a second application of the plurality of applications with second connection information and second access information to access a second resource from the first remote device. The method may include transmitting the first application to the first remote device upon configuration of the first application. The method may include transmitting the second application to the first remote device upon configuration of the second application.

In some embodiments, the method may further include detecting a change in the user role from a first user role to a second user role. The method may include determining, based on the change in the user role, that access to the second resource is revoked and that access to a third resource is permitted by the identity. The first resource, the second resource, and the third resource may be different from each other. The method may include instructing the first remote device to remove the second application based on determining that access to the second resource is revoked. The method may include provisioning, based on the second user role, access for the identity to a third application that provides access to a third resource in the enterprise system from the first remote device. The method may include configuring a third application of the plurality of applications with third connection information and third access information to access the third resource from the first remote device. The method may include transmitting the third application to the first remote device upon configuration of the third application. Provisioning access for the identity to an application may include provisioning an account that provides access to a resource accessible by the application for the identity.

The foregoing, together with other features and embodiments will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 5 depicts an example of a data structure for storing information indicating resources accessible to roles in an enterprise system according to some embodiments of the present invention.

FIG. 6 depicts an example of a data structure for storing information identifying a configuration of applications for accessing different resources in an enterprise system according to some embodiments of the present invention.

FIG. 8 depicts an example of a data structure for storing information identifying a status of application configurations for a remote device according to some embodiments of the present invention.

DETAILED DESCRIPTION

Figure 1:
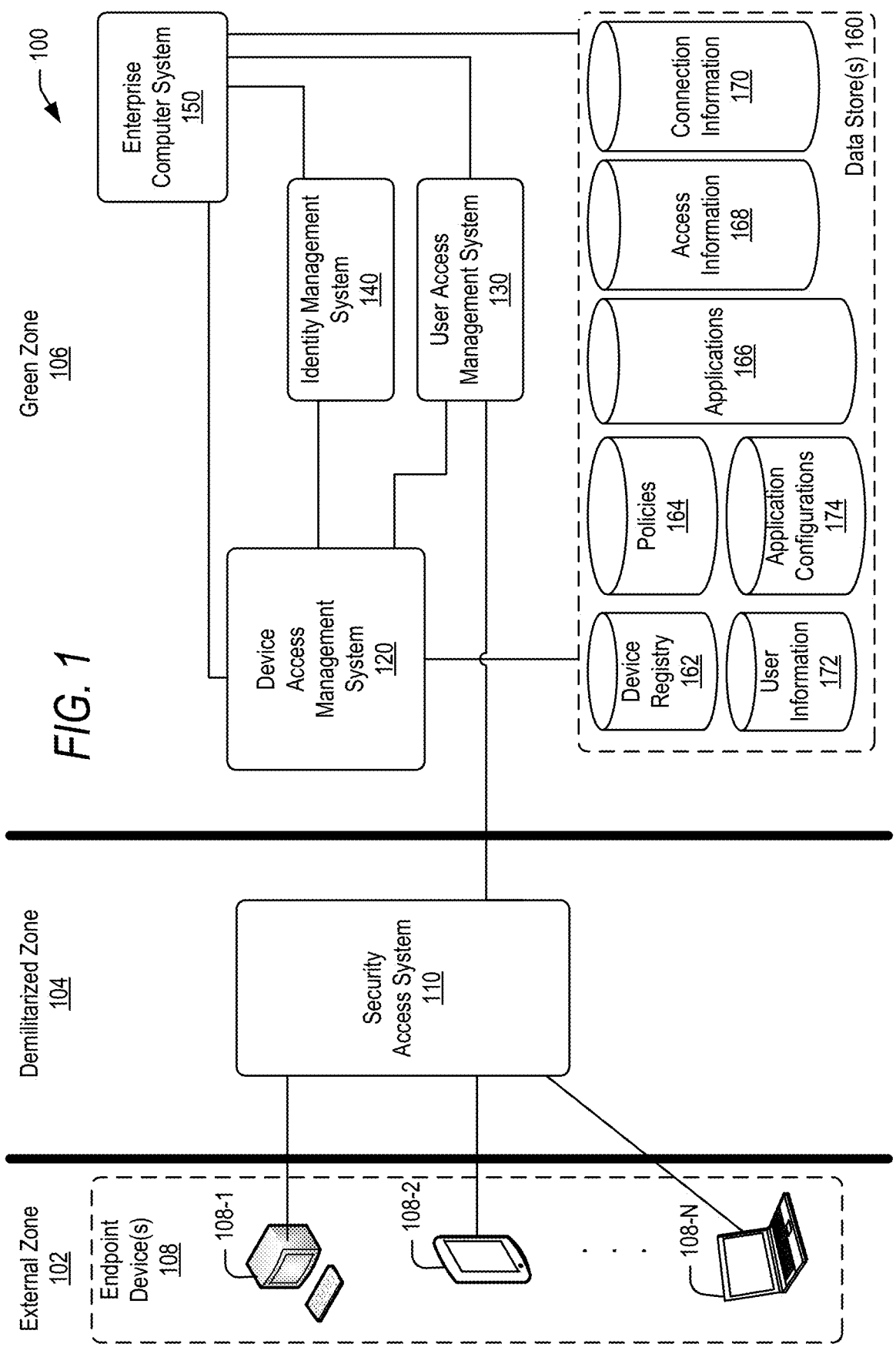
FIG. 1 depicts a simplified high level diagram of a computing system including a device access management system for managing access to an enterprise system using remote devices according to some embodiments of the present invention.

In the following description, for the purposes of explanation, specific details are set forth in order to provide a thorough understanding of embodiments of the invention. However, it will be apparent that various embodiments may be practiced without these specific details. For example, circuits, systems, algorithms, structures, techniques, networks, processes, and other components may be shown as components in block diagram form in order not to obscure the embodiments in unnecessary detail. The figures and description are not intended to be restrictive.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The present disclosure relates generally to managing access to an enterprise system using remote devices. More particularly, techniques are disclosed for unifying management of remote devices and user identities for enabling access to an enterprise system. Techniques are disclosed for provisioning applications on remote devices to access resources in an enterprise system. Specifically, applications may be automatically configured with access information (e.g., account information) and connection information to access a resource in an enterprise system using a remote device. A configured application may enable a user of a remote device to access a resource without having to manually configure the application to access the resource.

In some embodiments, a device access management system may be implemented to configure an application to access a resource using a remote device. An application may be automatically configured for any number of reasons including registration of a remote device for a user, receiving a request to access a resource, discovering that access has been granted to a new resource, or discovering of a new application. Configuring an application may include determining an account for accessing a resource using the application. An account may be determined for a user associated with the remote device for which an application is to be configured. Based on a role of the user, an account may be provisioned to access a resource if an account is not already provisioned for the resource. In some embodiments, access to a resource may vary based on the role of a user. By determining an account of a user, the user is not burdened by an additional process of retrieving account information or requesting an account before configuring an application to access a resource.

The device access management system may automatically configure an application to reduce or eliminate a process by which a user may have to configure an application. Often times, remote devices may vary in their attributes (e.g., type of device and platform of the device), such that configuring an application may involve different process depending on the attributes of a device. A user may be unfamiliar with the different processes for configuring an application. For a user having several remote devices, the user may be burdened by having to configure an application on each of those remote devices. An enterprise may be equally burdened with having to provide a mechanism to ensure an application can be configured properly on each of the remote devices registered for a user. The device access management system may automatically configure the application with at least access information (e.g., account information) and connection information (e.g., a port address, a host address, or a data access protocol) for each of the remote devices registered for a user. In some embodiments, one or more settings related to a feature of an application may be configured. The setting(s) may be configured based on a role of a user or preferences of the user. Once an application is configured, the application may be executed to access a resource. A user may have to provide confidential access information (e.g., a password) to access a resource using an application that has been configured. Neither the user nor the enterprise may have to manually configure an application to access a resource.

Upon configuring an application, the device access management system may transmit a configured application to the remote device(s) for which the application is configured. In some embodiments, the configured application may be transmitted to a remote device using a push notification service. Once the configured application is received, the application may be automatically installed on the remote device, after which the application may be executed to access a resource. In some embodiments, a configured application may be stored in a data store (e.g., an application catalog), where a remote device can access and/or retrieve the application. The remote device may receive a notification of the availability of the application in the data store. In some embodiments, a configuration of an application rather than a configured application may be transmitted to a remote device. The remote device may configure the application based on the received configuration.

An application may be configured for multiple remote devices, which may be registered to different users. Where an application may be configured similarly for multiple remote devices registered for a user, the device access management system may transmit the application to each of those remote devices. By configuring applications for users, an enterprise can ensure that remote devices are provided with a current application without a user having to take steps to identify and obtain the application for each of those remote devices. Configuring the application for multiple devices may improve processing efficiency for distribution of an application by reducing the overall number of requests for the application to an enterprise system.

Upon discovering a change in access to a resource in an enterprise system, the device access management system may automatically modify a configuration of an application that provides access to the resource. A change in access may be caused by any number of change events including, without limitation, a change in a user role of one or more users, an update to an application, a change in compliance with a policy, and a change in a configuration of a remote device. Based on the change, the device access management system may modify a configuration of an application for one or more remote devices affected by the change. For example, when access to a resource is revoked, a configuration of an application may be modified to delete the configuration. In some embodiments, the device access management system may transmit an instruction to a remote device affected by the change. The instruction, upon its receipt, may cause the remote device to modify a configuration of an application based on the change in access. When access to a resource is revoked, the instruction may direct a remote device to remove an application that provides access to the resource. Upon discovering that access to a new resource is granted, an application may be configured for remote devices registered to users that are permitted to access the discovered resource. The newly configured application may be transmitted to those remote devices permitted to install the configured application.

FIG. 1 depicts a simplified high level diagram of a computing system 100 for managing access to an enterprise system using remote devices according to some embodiments of the present invention. Specifically, computing system 100 may unify management of remote devices and user identities for enabling access to an enterprise system. Computing system 100 may facilitate provisioning of applications to remote devices to access resources in an enterprise system. Embodiments depicted in FIG. 1 are merely examples and is not intended to unduly limit the claimed embodiments of the present invention. One of ordinary skill in the art would recognize many variations, alternatives, and modifications.

Computing system 100 may be part of an enterprise system implemented for an enterprise. Computing system 100 may include enterprise computer system 150, which provides access to one or more resources provided by the enterprise system. Examples of resources may include a hardware resource, a software resource (e.g., an application), a data resource, a service resource, a place, an object, etc.). Resources may be provided by enterprise computer system 150, or may be hosted by a third party provider and provided to remote devices by enterprise computer system 150. In some embodiments, a resource may be provided by one or more target systems that may be implemented by enterprise computer system 150 or by a third party provider. For example, an email service may be provided to a user of a remote device by an email service system. The email service may be accessed from the remote device using an application configured to communicate with the email service system. The email service system may be included in or accessible from enterprise computer system 150.

Users may access enterprise computing system 150 using one or more remote devices, such as remote devices 108-1, 108-2, . . . 108-N (collectively remote devices 108). Access to enterprise computer system 150 using remote devices 108 may be controlled and managed by device access management system 120. Each of remote devices 108 may include a secure container application. The secure container application may provide a secure execution environment for communicating with device access management system 120 to access enterprise computer system 150. Remote devices 108 may communicate with device access management system 120 to obtain access to resources provided by enterprise computer system 150.

Device access management system 120 may manage authentication and enrollment of remote devices 108 for accessing enterprise computer system 150. Remote devices 108 may be enrolled for user identities registered to access enterprise system 120. Just as a user identity is used to authenticate a user, a remote device may be registered with an identity that is used to authenticate the remote device. An identity may be provisioned to a remote device and may be used to authenticate all further communications from that remote device. User information data store 170 in data stores 160 may include information about users registered to access enterprise computer system 150. The information may include user identity information about a user. Examples of user information are described with reference to FIG. 5.

A user registered to access enterprise computer system 150 may register one or more of remote devices 108 to access enterprise computer system 150. Device access management system 120 may provide an interface for registering a remote device for an identity of enterprise computer system 150. For example, device access management system 120 may provide a user of a remote device with a graphical user interface (GUI) that enables a user of the remote device to register information about a remote device to be associated with an identity of that user registered to access enterprise computer system 150. Device access management system 120 may issue a certificate to a remote device for enrollment of that remote device with a user identity for accessing enterprise computer system 150. Device access management system 120 may allow a remote device to access enterprise computer system 150 if a request is from a user identity associated with an identity of the remote device.

Device access management system 120 can store device information about a remote device in a "device record". A device record may be stored in association with user information indicating an identity of a user that registers the remote device. User information may be stored in user information data store 172. In some embodiments, a remote device may be registered to multiple identities, each of which may be associated with a single user or different users. The device record may be stored in device registry 162. Examples of user information and device records are described with reference to FIG. 7.

By storing device information in association with user information (e.g., an identity) for accessing enterprise computer system 150, remote devices 108 and identities may be managed in a unified manner. A remote device used to access enterprise computer system 150 may be identified with an identity of a user based on the association between a device record of the remote device and the identity of the user. As described below, an association between remote devices 108 and one or more identities may improve management of access to enterprise computer system 150 using remote devices 108.

In some embodiments, one or more remote devices 108 may access a resource provided by enterprise computer system 150 using an application configured to access the resource. Device access management system 120 may provision an application for a remote device associated with an identity of a user. As described further below, device access management system 120 may configure a provisioned application for communication with enterprise computer system 150 to access a resource or to communication directly with a target system that provides the resource. An application may be configured for operation on a remote device registered to an identity of a user. For example, an application may be configured with access information (e.g., a user identity, an access token, or other credential information) and connection information (e.g., a host server, a port address, communication information, or other protocols) for connecting with a computing system (e.g., a computing system of a target system) to access a resource in enterprise computer system. Provisioning an application that provides access to a resource may include determining an account for an identity of a user accessing the resource from a remote device. If an account has not been provisioned for the identity of the user, enterprise computer system 150 may provision an account to access the resource. An application configured for an identity of a user may be transmitted to a remote device registered for the identity. A user associated with the identity may operate the configured application to access the resource for a provisioned account.

Computing system 100 may be defined by multiple zones, each corresponding to a different communication zone. In some embodiments, remote devices 108 may be located in an external communication zone ("external zone") 102. Device access management system 120 and enterprise computer system 150 may be located in a green communication zone ("green zone") 106. Green zone 106 may include one or more secure networks (e.g., a corporate network). Green zone 106 may be located inside the firewalls of an enterprise computing environment. External zone 102 may be part of an external network (e.g., the Internet), which can be unsecure. For example, external zone 102 may be located outside the firewalls of green zone 106.

In some embodiments, remote devices 108 may communicate with computer systems in green zone 106 through a security access system 110 located in a demilitarized zone (DMZ) 104. An example of DMZ 104 may be a corporate DMZ. Security access system 110 may facilitate secure communication between remote devices 108 and device access management system 120. For example, security access system 110 may provide a secure communication connection (e.g., tunnel) between a secure container application on any of remote devices 108 and device access management system 120.

Security access system 110 may provide services to authenticate a user of a remote device. Security access system 110 may communicate with a user access management system 130 to obtain authorization for a user of a remote device. For example, security access system 110 may obtain authorization tokens from user access management system 130 to facilitate single sign-on (SSO) authentication to resources provided by enterprise computer system 150. In one example, security access system 110 may be included in Oracle Mobile Security Access Server, which is part of Oracle Mobile Security Suite provided by the Oracle® Corporation.

Remote devices 108 may be of various different types, including, but not limited to, endpoint devices, a wearable device (e.g., a smart watch), a consumer device (e.g., an appliance), personal computers, desktops, Internet of Things (IOT) devices, mobile or handheld devices such as a laptop, a mobile phone, a tablet, computer terminals, etc., and other types of devices. In some embodiments, a remote device may be an application hosted on a computing device (e.g., a mobile device, an IOT Gateway, or an IOT Edge device). In some embodiments, a remote device may be endpoint, such as a workspace, that is running on another device. A workspace may be a controlled environment to provide access to enterprise data and applications on a device running the workspace. For example, a secure container application may run on one or more of remote devices 108. Examples of remote devices may include, without limitation, devices (e.g., a corporate device) issued by an enterprise associated with enterprise computer system 150 or a user's personal device ("BYOD device") that is used to access enterprise computer system 150.

A remote device may store information about its identity, for example, a MAC (media access control) address, a unique device identifier (UDID), or other device identifiers. A remote device may store metadata attributes about the remote device, including, a type of operating system on the remote device, a version of the operating system, a host identifier if the remote device is hosted on another device, a device type, an IMEI (International Mobile Equipment Identity) number, a model of the remote device, a service provider (e.g., a carrier) of the remote device, a device name, a device state, a compliance status, or other information about the remote device.

In some embodiments, a remote device may be configured to determine device information about the remote device. The device information may include a state of operation of the remote device. The state of operation may indicate any of the following: when applications were installed, executed, and/or uninstalled; whether hardware and/or software in the remote device has been altered; information about applications (e.g., a password for an application); activity or inactivity related to use of the remote device; or other information related to execution or use of the remote device. A remote device may be configured to communicate with device access management system 120. For example, a remote device may periodically synchronize ("device sync") with device access management system 120 to provide device access management system 120 with device information about the remote device. In some embodiments, device access management system 120 may determine information about a remote device based on information that is received or not received from a remote device.

In certain embodiments, a remote device may be configured to implement (e.g., execute and operate) one or more applications. For example, one or more of remote devices 108 may execute a secure container application that is designed to hold "containerized" applications, i.e., applications that have been securely linked to their specific container. Examples of applications may include, without limitation, a computer application, a client application, a proprietary client application, a workspace, a container, and the like. In some embodiments, an application implemented by a remote device may be accessible or operated via one or more network(s). An application configured by and received from enterprise computer system 150 to access a resource may be installed and executed in the secure container application. The secure container application may be configured to modify a configuration of an application based on instructions received from device access management system 120.

A remote device may include a computing device that can be implemented using hardware, firmware, software, or combinations thereof. A remote device may include memory and one or more processors. The memory may be coupled to the processor(s) and may include instructions stored thereon which, when executed by the processor(s), cause the processor(s) to implement one or more operations, methods, or processes disclosed herein. A memory may be implemented using any type of persistent storage device, such as computer-readable storage media.

In some embodiments, remote devices 108 may be communicatively coupled to device access management system 120 and enterprise computer system 150 via one or more communication networks of various types. Examples of communication networks include, without restriction, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk, Bluetooth®, and other protocols.

Device access management system 120 may be implemented in a computer system, which may comprise one or more computers and/or servers which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. For example, device access management system 120 may include servers. All or some of servers may be located in the same geographical location or different geographical locations. The computing devices that make up device access management system 120 may run any of operating systems or a variety of additional server applications and/or mid-tier applications, including HTTP servers, FTP servers, CGI servers, Java servers, database servers, and the like. Exemplary database servers include without limitation those commercially available from Oracle, Microsoft, and the like. Device access management system 120 may be implemented using hardware, firmware, software, or combinations thereof. In one example, device access management system 120 may be included in Oracle Mobile Security Manager, which is part of Oracle Mobile Security Suite provided by the Oracle® Corporation.

Device access management system 120 may include at least one memory, one or more processing units (or processor(s)), and storage. The processing unit(s) may be implemented as appropriate in hardware, computer-executable instructions, firmware, or combinations thereof. Computer-executable instructions or firmware implementations of the processing unit(s) may include computer-executable or machine-executable instructions written in any suitable programming language to perform the various operations, functions, methods, and/or processes described herein. The memory in device access management system 120 may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer-readable storage media. In some embodiments, computer-readable storage media may be configured to protect a computer from an electronic communication containing malicious code. The computer-readable storage media may include instructions stored thereon, that when executed on a processor, perform the operations described herein.

Device access management system 120 may also include or be coupled to additional storage, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. For example, device access management system 120 may be coupled to or may include one or more data stores, e.g., data stores 160. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data.

Device access management system 120 may be communicatively coupled to an identity management system 140. Identity management system 140 may manage the lifecycle of users of enterprise computer system 150 and their associated accounts provisioned for resources accessed from enterprise computer system 150. Identity management system 140 may manage roles (e.g., user groups) defined for accessing enterprise computer system 150. In some embodiments, identity management system 140 may implement manage policies for roles defined for accessing enterprise computer system 150. User information data store 172 may include information obtained about a user from identity management system 140. The information may include one or more user roles associated with an identity of a user. Identity management system 140 may manage the role(s) defined for accessing enterprise computer system 150. Examples of identity management system 140 may include Oracle Identity Manager provided by the Oracle® Corporation.

User access management system 130 may be communicatively coupled to device access management system 120. User access management system 130 may handle scope management, issuance of authorization tokens, issuance of refresh tokens, and issuance of access tokens. For example, user access management system 130 may process requests from security access system 110 for access by remote devices 108. In some embodiments, user access management system 130 may manage access policies for access to resources provided by enterprise computer system 150. Examples of user access management system 130 may include Oracle Access Manager provided by the Oracle® Corporation.

In some embodiments, device access management system 120 may manage settings of remote devices 108 that are enrolled to access enterprise computer system 150. Examples of settings may include, without limitation, device settings, installation settings, synchronization settings, communication settings, application settings, or other settings related to accessing an enterprise system. Information about settings may be stored in data stores 160. Some settings may correspond to information received from remote devices 108. Settings (e.g., device settings and installation settings) for some remote devices 108 may be verified for enrollment and checked for compliance by enrolled remote devices 108. In some embodiments, settings (e.g., synchronization settings) may be communicated to some remote devices 108 to enable the secure container application on remote devices 108 to configure synchronization of communication with device access management system 120 and enterprise computer system 150.

Access to enterprise computer system 150 using remote devices 108 can be managed using one or more policies. Policies may be stored in and accessed from policies data store 164 in data stores 160. Examples of policies may include, without limitation, enrollment policies, compliance policies, workspace policies, and device policies. In some embodiments, information about compliance policies may be received from enterprise computer system 150, identity management system 140, and/or user access management system 130. One or more policies may be configured based on input received from an operator (e.g., an administrator) of device access management system 120. Device access management system 120 may determine whether remote devices 108 are compliant with policies. A policy may define access to enterprise computer system 150 using a remote device. In some embodiments, device access management system 120 can perform remedial actions to adjust access for a remote device based on a policy. Device access management system 120 may communicate instructions to a remote device to instruct the remote device to take remedial action in response to compliance according to a policy. Notifications can be sent to remote devices 108 to inform them of compliance and/or non-compliance with a policy and a time period for compliance.

Device access management system 120 may manage one or more applications enabling access to one or more resources in enterprise computer system 150. Applications may be stored in applications data store 166. Applications data store 166 may be accessed by a secure container application executing on the remote device. An application may provide access to one or more resources in enterprise computer system 150. For example, an email application may provide access to an email service provided by enterprise computer system 150. In another example, a human resources (HR) application may provide access to human resources data managed by enterprise computer system 150.

As discussed further below, an application may be provisioned to one or more of remote devices 108 registered to a user. An application may be provisioned for a variety of reasons. For example, an application may be provisioned for any number of reasons including registration of a remote device for a user, receiving a request to access a resource, discovering that access has been granted to a new resource, or discovering of a new application. Provisioning an application may include automatically configuring the application to access a resource using the application.

To provision an application, device access management system 120 may automatically configure the application with at least access information (e.g., account information) and connection information (e.g., a port address, a host address, or a data access protocol) for each of remote devices 108 registered for a user. The access information may be managed in access information data store 168 of data stores 160. The connection information may be managed in connection information data store 170 of data stores 160. In some embodiments, one or more settings related to a feature of an application may be configured. The setting(s) may be configured based on a role of a user or preferences of the user. Device access management system 120 may store configured applications in applications data store 166. In some embodiments, a configuration of an application may be stored in application configurations 174.

In some embodiments, provisioning an application may include determining an account for accessing a resource using the application. An account may be determined for a user associated with the remote device for which an application is to be configured. Based on a role of the user, device access management system 120 may provision an account to access a resource if an account is not already provisioned for the resource.

Using a variety of techniques, device access management system 120 may automatically provide a configured application to the remote device(s) for which the application is configured. In some embodiments, device access management system 120 may provide a configuration of the application to the remote device(s) instead of an entire application. In some embodiments, device access management system 120 may use a push notification service to provide the configured application to the remote device(s). The application may be automatically installed on the remote device according to the configuration application or the configuration of the application provided to the remote device.

By providing users of remote devices with configured applications, users may not be burdened with having to manage individual applications to access resources. Further, users can be automatically provided with applications as new applications become available. A processing load on an enterprise system can be reduced by eliminating individual requests for applications. When multiple remote devices are registered with a user, each of the remote devices can be provisioned with a configured application that includes account information. By provisioning applications to remote devices, an enterprise can ensure that remote devices accessing an enterprise system are configured with applications that satisfy access policies of the enterprise. As access changes in an enterprise system, remote devices can be automatically updated with modified applications without having to assess compliance and determine access to resources. In an enterprise system having thousands of remote devices, an application that is configured for use on multiple remote devices can be configured once, and efficiently distributed to those remote devices.

Figure 2:
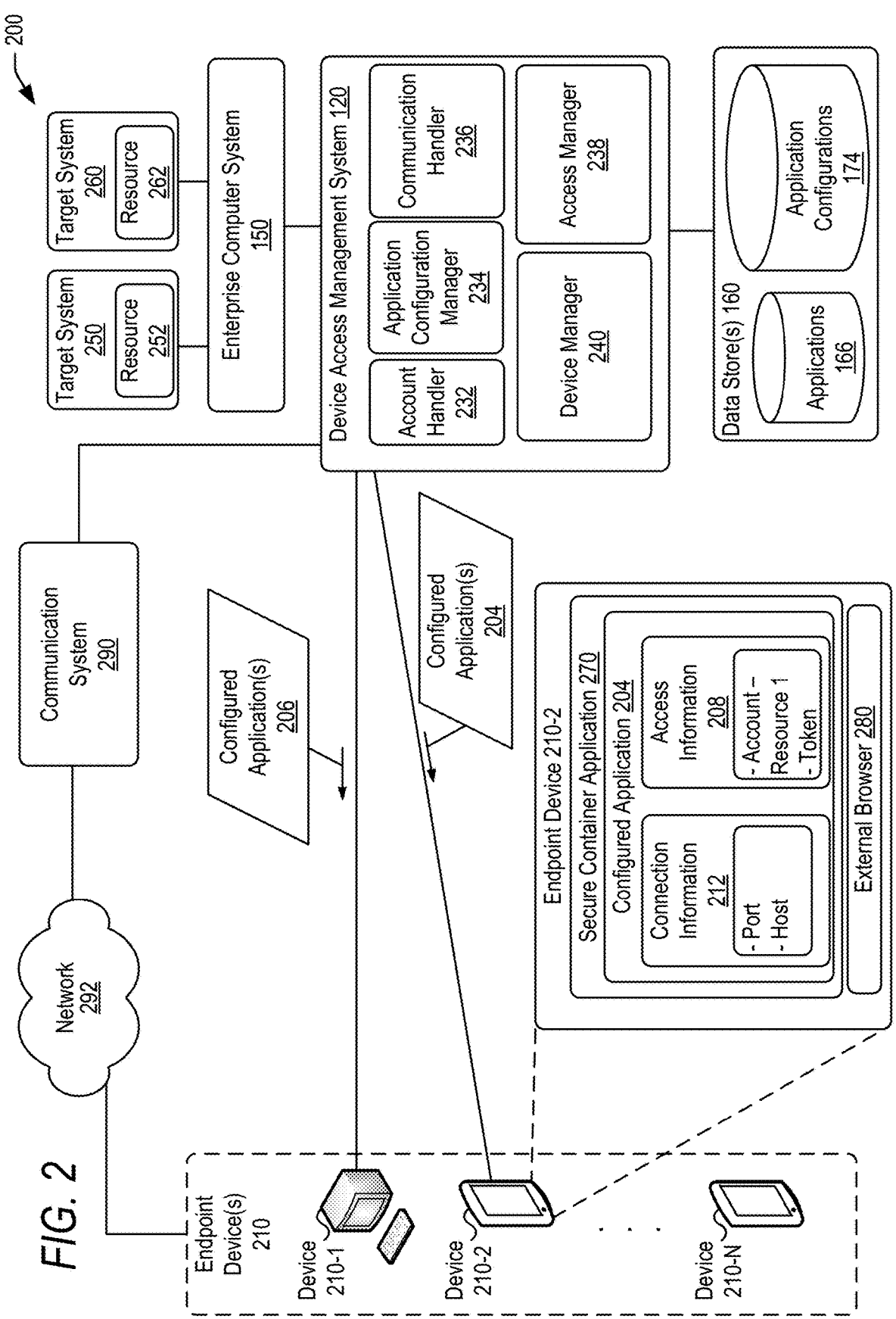
FIG. 2 shows a more detailed high level diagram of a device access management system according to some embodiments of the present invention.

Now turning to FIG. 2, a more detailed high level diagram of device access management system 120 is shown according to some embodiments of the present invention. As shown in FIG. 2, device access management system 120 may include several subsystems and/or modules including account handler 232, application configuration manager 234, communication handler 236, access manager 238, and device manager 240. These subsystems and modules may be implemented in software (e.g., program code, instructions executable by a processor), in hardware, or combinations thereof. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.).

With the adoption of BYOD for enabling access to an enterprise system (e.g., enterprise computer system 150), many users may access the enterprise system using their remote devices. One or more remote devices, such as endpoint devices 210-1, . . . 210-N (collectively, endpoint devices 210), may be operated to access enterprise computer system 150. Although FIG. 2 depicts some remote devices that are used to access enterprise computer system 150, enterprise computer system 150 may be accessed by thousands of users with thousands of remote devices. Access to the enterprise system may be controlled through a computing system (e.g., computing system 100) including device access management system 120. Remote devices may be used to access one or more resources in enterprise computer system 150.

In the example shown in FIG. 2, enterprise computer system 150 may include or may be communicatively coupled to one or more target systems, e.g., target system 250 and target system 260. Each of target systems 250, 260 may provide a resource in enterprise computer system 150. For example, target system 250 may provide resource 252 and target system 260 may provide resource 262. Access to each of resources 252, 262 may be controlled by an account provisioned for accessing each of those resources.

Each of endpoint devices 210 may include a secure container application that is configured to communicate with device access management system 120. Secure container application 270 may be distinct from other applications (e.g., external browser 280) executing on a remote device. For example, endpoint device 210-2 may include secure container application 270 executing on endpoint device 210-2. Secure container application 270 may be configured to communicate with device access management system 120. In some embodiments, secure container application 270 may be configured to manage access to enterprise computer system 150 based one or more policies for accessing enterprise computer system 150. Secure container application 270 may be configured to execute applications configured by device access management system 120.

Endpoint device 210-2 may perform device synchronization communication ("device synchronization" or "device sync") to communicate device information about endpoint device 210-2 to device access management system 120. Endpoint device 210-2 may periodically synchronize with device access management system 120. In some embodiments, device access management system 120 may initiate device synchronization with one or more remote devices, e.g., endpoint devices 210.

In some embodiments, each of endpoint devices 210 may have access to information stored in data stores 160 to configure an application to access a resource from the remote device. In some embodiments, secure container application 270 may be configured to execute one or more operations (e.g., configuring an application to access a resource in enterprise computer system 150) based on an instruction from device access management system 120.

With thousands of remote devices accessing an enterprise system, configuring applications for those remote devices to access resources in an enterprise system may be difficult to manage. Applications enabling access to resources may need to be configured to comply with one or more policies governing access to those resources in enterprise computer system 150. An application enabling access to a resource may be configured differently based on one or more factors, including, without limitation, device attributes, connection attributes, user roles, or types of resources being accessed. As such, an application may be configured differently for one or more of a plurality of remote devices registered for a user. Even more difficult is adjusting a configuration of an application to access a resource based on a change event that occurs in an enterprise system.

Access to resources may change based on the occurrence of change events in enterprise computer system 150. A change event may correspond to an event related to a change in access to an enterprise system. Access to a resource, e.g., resource 252 or resource 262, may change based on a change in access corresponding to a change event. Examples of changes events may include, without limitation, a change in access to enterprise computer system 150 based on non-compliance with a policy, a change on a remote device (e.g., modification of hardware or software on the remote device), a change in a user role associated with a remote device, a change in access granted to a resource in enterprise computer system 150, and other changes that affect access to enterprise computer system 150. To overcome these and many other obstacles for configuring applications for thousands of remote devices, device access management system 120 may automatically configure applications to enable remote devices to access resources in enterprise computer system 150. A configuration of applications may be modified based on a change event that affects access to a resource using the application.

Device manager 240 may manage access to enterprise computer system 150 for remote devices (e.g., endpoint devices 210). Specifically, device manager 240 may manage enrollment of remote devices to access enterprise computer system 150 based on one or more enrollment policies. Device manager 240 may handle communication with remote devices. Communication may include synchronization ("device sync") between a remote device and device access management system 120. Device synchronization may include communication of device information about a remote device from the remote device to device access management system 120. Device information may be stored in a device record in device registry 162. The device information for a remote device may be used to configure an application for execution on that remote device. Device manager 240 may discover new remote devices that are registered to access enterprise computer system 150.

Device manager 240 may detect when device information indicates a change event corresponding to a change in a registered remote device. Examples of changes to a remote device may include, without limitation, adjusting a configuration of hardware on the remote device or installing or removing an application on the remote device. Device manager 240 may determine whether a remote device is in compliance with one or more policies governing access to enterprise computer system 150.

Access manager 238 may implement or may facilitate communication with an identity management system, e.g., identity management system 140, and a user access management system, e.g., user access management system 130. User information including role(s) associated with a user identity may be obtained from identity management system 140. Access manager 238 may receive information about a change event related to a change in access to enterprise computer system 150. For example, access manager 238 may receive information from identity management system 140 indicating a change in a user role from one user role to another user role. The change in the user role may correspond to an association of a user role with an identity of a user or a disassociation of a user role with an identity of a user.

Access manager 238 may receive information from user access management system 130 indicating a change in access to enterprise computer system 150. The change in access may correspond to a change in access to a resource has been revoked or granted. Access to a resource may change based on a change in a policy. The change in access may correspond to a change in access for one or more roles. The change in access to a resource may affect access to the resource from remote devices registered to users whose access is affected by the change. In some embodiments, information about access to resources may be stored using techniques described with reference to FIG. 5. Such information may be obtained from user access management system 130. The information may indicate resources that are permitted or not permitted with respect to one or more user roles. Access manager 238 can use the information to determine access to a resource based on user roles.

Communication handler 236 may manage communication of messages (e.g., message 208) between device access management system 120 and remote devices, e.g., endpoint devices 210. Communication handler 236 may receive requests from endpoint devices 210. Requests may include a request for access to a resource from a target system or for an application to access a resource from a target system. Communication handler 236 may receive information communicated for a device synchronization from endpoint devices 210. The information may include device information. The device information may include information that indicates a change event, such as a change in compliance or a change in operation or configuration of a remote device.

Communication of messages (e.g., a request) between endpoint devices 210 and device access management system 120 may be facilitated through communication system 250. Communication system 290 may provide services to send, receive, store, and/or access messages, where a "message" can include any electronic communication generated by a sender and directed to one or more recipients, such as email messages, instant messages (e.g., messages sent between users using various "chat" services), SMS/MMS messages (e.g., messages conforming to Short Messaging Service and/or Multimedia Messaging Service protocols supported by various cellular and other wireless data networks), voice messages, photo/image messages, social network messages, and so on. Examples of messaging services may include email services such as Gmail™ (a service of Google Inc.) and Yahoo! ® Mail (a service of Yahoo! Inc.). Other examples may include instant messaging or chat services such as Gmail's chat feature or Facebook's chat (a service of Facebook, Inc.), SMS/MMS services provided by cellular data carriers, social network services with a messaging component (e.g., social networks provided by Facebook, Inc., or LinkedIn Corp.). Communication system 250 may provide web-based client interfaces, dedicated application programs, application program interfaces (APIs), and/or other tools for facilitating communication between device access management system 120 and endpoint devices 210.

Communication system 120 may communicate with endpoint devices via one or more communication networks (e.g., network 292) of various types. Examples of communication networks include, without restriction, the Internet, a WAN, a LAN, an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk, Bluetooth®, and other protocols.

To configure an application, account handler 232 may handle determining whether an account has been provisioned to a user for accessing a resource for an identity of a user. Account handler 232 may access user information data store 172 to identify an account, if one exists, for each identity which has been granted access to a resource. Upon determining that an account has not been provisioned for a user, account handler 232 may communicate with enterprise computer system 150 to provision an account for a user. In some embodiments, account handler 232 may communicate directly with a target system to provision an account. The information about the account may be configured in an application.

Application configuration manager 234 may determine whether to configure an application for accessing a resource, e.g., resource 262 or resource 272. An application may be configured for a remote device in many different circumstances, including, but not limited to, receiving a request from a remote device to access a resource accessible using an application, registration of a new remote device, and a change in access to a resource. For example, a change in a user role may enable a user to access one or more resources. In some instances, a plurality of applications may be defined as a group associated with a role. The plurality of application may be provisioned for users that are assigned the role associated with the group. In some embodiments, an application may be configured for a remote device upon detecting a change event at the remote device. The change event may correspond to a non-compliance of the remote device or a change in operation or use of the remote device (e.g., adjusting a configuration of the remote device). Once configured, a configuration of an application may be modified upon determining subsequent changes in access to a resource using the application. An application providing access to a resource may be configured differently for different users based on the access permitted to the resource.

Application configuration manager 234 may access applications data store 166 to retrieve an application for configuration to provide access to a resource for an identity of a user. An application may be configured to provide access to a resource or to revoke access to a resource. Application configuration manager 234 may access application configurations data store 174 to identify a configuration of one or more applications. Application configurations may be defined for different criteria including, but not limited to, device attributes, resources, user roles, features, and settings. In some embodiments, a configuration of an application may be predefined based on one or more criteria identified above. For example, connection information for an application may be pre-defined based on a computing system providing the resource.

Application configuration manager 234 may configure an application for one or more remote devices registered to a user based on the access permitted to a resource accessible using the application. An application may be configured using a variety of techniques. A configuration of an application may be pre-defined in part. Configurations of applications may be stored in application configurations data store 174. Application configuration manager 234 may store application configurations using techniques described with reference to FIG. 6.

On technique may include modifying code (e.g., execution code) for the application to indicate one or more connection attributes for establishing a connection to a computing system (e.g., a target system) that provides a resource. For example, code for an application may be configured with a uniform resource locator (URL) indicating a computing system to access for a resource. The URL may indicate one or more connection attributes that may be used to connect to the computing system. In some embodiments, an application may be regenerated based on the modified code of the application. Examples of connection attributes may include, without limitation, a port address of a computing system, a host address of a computing system, one or more access protocols supported by a computing system, or other attributes for defining a connection with a computing system. In some embodiments, a configuration file accessed by the application may be configured with values for one or more connection attributes. The configuration file may be stored in a memory accessible to the application during execution or may be included with the code for the application. In some embodiments, a configuration of an application may be referenced in application configurations data store 174, where a configuration is stored for an application. In some embodiments, an application may provide an interface (e.g., an application programming interface) for dynamic configuration of the application. The interface may accept one or more attributes for configuration of an application.

Application configuration manager 234 may configure one or more access attributes for an application. An access attribute may be used to determine access to a resource from an application. An application may be configured with access information for one or more access attributes using one or more of the configuration techniques described above. Examples of access attributes may include, without limitation, an account identifier, an access token for a user, credential information, and other information used to determined access to a resource. Access manager 238 may obtain access information for access to a resource by a registered user.

In some embodiments, application configuration manager 234 may configure one or more settings of application. A setting of an application may correspond to one or more features of the application. A setting may be configured using one or more of the configuration techniques described above. A setting may be configured with respect the access to a resource permitted to a user. For example, one or more settings may be configured to enable or disable a feature in application based on access permitted to a resource. In another example, a setting may be configured for an application based on one or more device attributes. In some embodiments, a setting in an application may be configured differently based on a device attribute, e.g., a type of remote device or a platform on the remote device.

Application configuration manager 234 may modify a configuration of an application upon determining that a change event has occurred (e.g., access to a resource by the application has changed). Upon detecting a change event related to a change in access to a resource, application configuration manager 234 may adjust or revoke access to a resource. One or more connection attributes, one or more access attributes, and/or one or more settings may be configured based on the change in access. A configuration of an application may be modified using one or more of the techniques described above. For example, one or more connection attributes and/or one or more access attributes configured for an application may be deleted when access to a resource using the application is revoked. In some embodiments, when access to a resource is revoked, an application may be removed entirely from a remote device. Application configuration manager 234 may utilize communication handler 236 to communicate an instruction to a remote device to request the remote device to remove an application. In other examples, when access to a resource is granted, an application may be configured accordingly to access that resource. In some embodiments, a configuration of an application may be modified for one or more settings to enable a feature that provides access to the additional resource.

Application configuration manager 234 may manage a status of configured applications for a remote device using techniques described with reference to FIG. 8. The status of a configuration of an application may be used to determine whether to modify a configuration of an application.

An application, once configured, may be provided to a remote device using a variety of techniques. In some embodiments, an entire application that is configured may be transmitted to one or more remote devices registered for a user. Communication handler 236 may transmit a configured application to one or more remote devices. For example, communication handler 236 may transmit one or more configured applications 204 to endpoint device 210-2 and may transmit one or more configured applications 206 to endpoint device 210-1. Each of configured applications 204 and configured applications 206 may be provisioned for access to the same or different resources.

In some embodiments, communication handler 236 may provide a configured application to a remote device via communication system 290. Communication system 290 may implement a push notification service (e.g., Apple push notification service provided by the Apple® corporation or Google notification service provided by the Google® corporation). The push notification service may facilitate communication with remote devices (e.g., endpoint devices 210) through network 292. The push notification service may deliver a configured application to an endpoint device. Endpoint devices 210 may be configured to check network 292 for push notifications and to pull any such notifications including notifications about a configured application.

In some embodiments, a configuration of an application may be provided to endpoint devices 210 instead of an entire application. Using techniques described above, communication handler 236 may send a configuration, which may be sent to an endpoint device by sending a notification that indicates a configuration of an application or that indicates that the configuration may be accessed in application configurations data store 174. A secure container application executing on an endpoint device may use or access the configuration and may configure the application based on the configuration. In some embodiments, a secure container application may first retrieve an application if not installed on an endpoint device and then may configure the application. In some embodiments, the notification may be sent with information indicating that a configured application is located in data stores 160. For example, a configured application may be stored in applications data store 166, which may be accessed through an interface (e.g., an application catalog). A notification may be communicated to an endpoint device to inform the endpoint device that one or more configured applications are available in applications data store 166. A secure container application on an endpoint device may access the applications data store 166 to retrieve the configured application.

In the example shown in FIG. 2, endpoint device 210-2 may receive configured application 204. Secure container application 270 may install configured application 204 for execution in secure container application 270. Configured application 204 may be configured with connection information 212 indicating values for one or more connection attributes (e.g., a port address of a target system and a host address of a target system). Configured application 204 may be configured with access information 208 for one or more access attributes (e.g., account information for a resource and an access token). A user associated with endpoint device 210-2 may operate endpoint device 210-2 to use configured application 204 to access a resource in a target system identified by connection information. In some embodiments, a user may be requested to provide credentials to access a resource using an account configured by access information 208.

Figure 3:
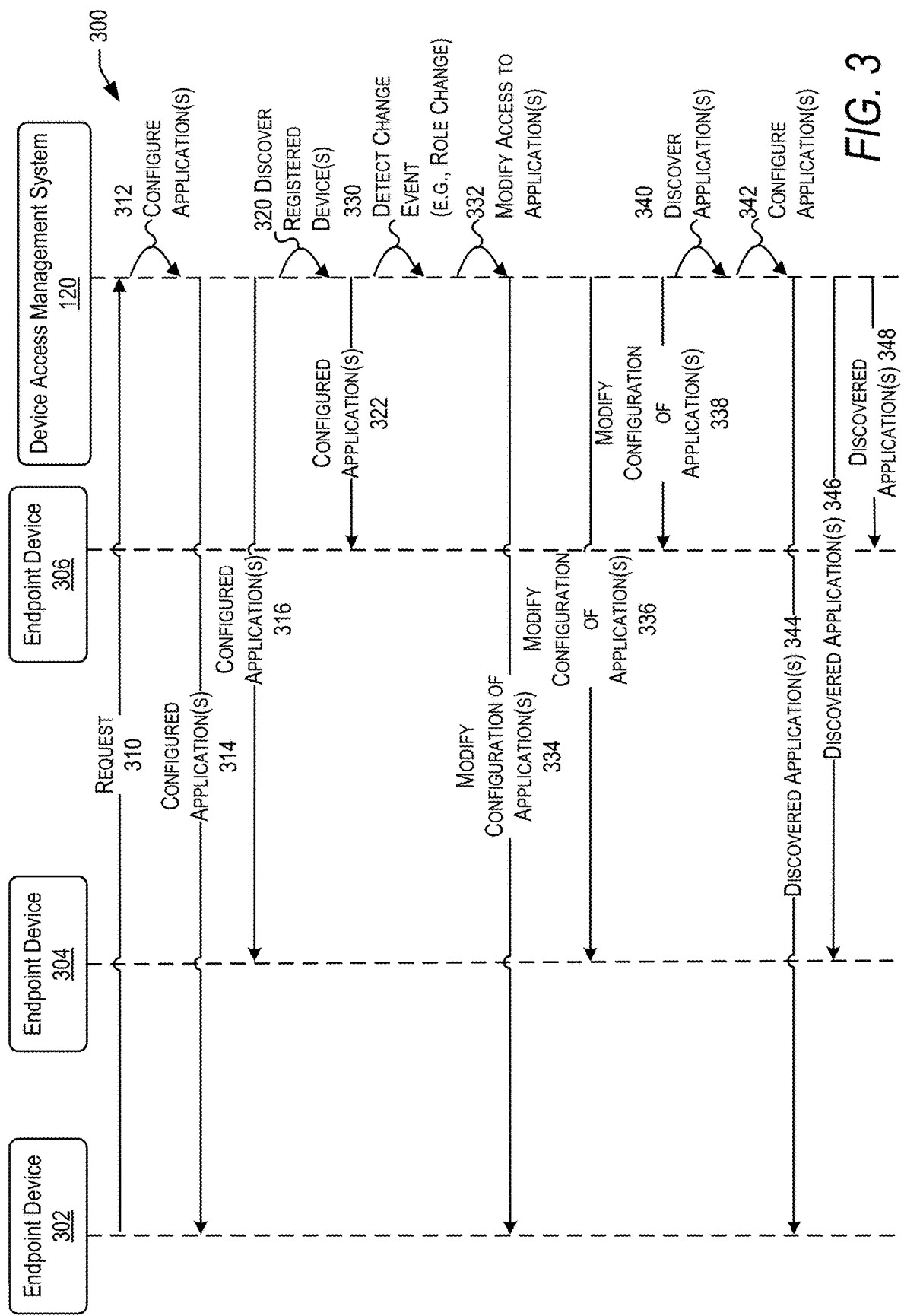
FIG. 3 illustrates a sequence of operations for provisioning of applications to remote devices according to some embodiments of the present invention.

Now turning to FIG. 3, an example is illustrated of a sequence of operations 300 for provisioning of applications to remote devices according to some embodiments of the present invention. In this example, a plurality of remote devices (e.g., endpoint devices 302, 304, and 306) may be enrolled for access to an enterprise system, e.g., enterprise computer system 150. In the example shown in FIG. 3, each of endpoint devices 302, 304, 306 are described as being registered with an identity of a user for the enterprise system.

The sequence of operations 300 may be initiated by a request 310 from a remote device (e.g., endpoint device 302) registered for an identity of a user to access an enterprise system. Request 310 may be communicated for access a resource or an application in the enterprise system.

Device access management system 120 may perform operations 312 in response to request 310. Device access management system 120 may identify one or more applications that are either indicated in request 310 or that provide access to one or more resources indicated by request 310. The identified application(s) may be configured to access a resource in the enterprise system using the remote device associated with request 310. An application may be configured with access information enabling an account to access a resource in the enterprise system. An application may be configured with connection information enabling a remote device executing the application to connect to a target system providing access to the resource. In some embodiments, an application may be configured for a remote device based on a configuration of the remote device (e.g., a type of the remote device or a platform of the remote device). In some embodiments, an application enabling access to a resource may have different versions, each corresponding to a different configuration of a remote device.

In the example shown in FIG. 3, a configured application may be provided to multiple endpoint devices registered for an identity of a user of request 310. A request, e.g., request 310, may be received from one remote device registered for an identity of a user, and in response, a configured application may be distributed to the remote devices registered for the identity. For example, an application configured by device access management system 120 in response to request 310 may be transmitted 314, 316 to each of endpoint device 302, and endpoint device 304, respectively. A user may be afforded benefit of receiving an application configured for all of the user's registered remote devices, without having to request and configure the application individually on each remote device registered with that user. The applications may be configured specifically based on a configuration of each remote device that is registered. The user can operate any of his registered remote devices to access a resource using the configured application. An enterprise system may improve its processing efficiency by reducing the number of individual requests from each registered device for an application. Instead, device access management system 120 can configure the application once and distribute it to all remote devices.

In some embodiments, device access management system 120 may discover 320 one or more remote devices (e.g., remote device 306) that have become registered with the enterprise system for an identity of a user (e.g., the identity for which endpoint devices 302, 304 are registered). The remote devices may be discovered by the addition of device information (e.g., a device record) in device registry 162. The device information may be associated with the identity of the user. The remote device(s) may be discovered after an application has been configured and transmitted to other remote devices registered for the same identity. For example, newly registered remote devices may be discovered as registered with an identity of a user after a configured application is transmitted to other remote devices registered to the identity.

Upon discovering a registered remote device, an application that was previously configured for other remote devices may be transmitted 322 to the discovered remote device. In some embodiments, device access management system 120 may configure the application for the discovered remote device(s) using techniques described above.

In some embodiments, device access management system 120 may detect 330 a change event in an enterprise system. The change event may be one which affects access to a resource for an identity of a user. For example, the change event may correspond to a change in a user role from one user role to another user role. In another example, the change event may correspond to a change in an access policy for a user role. As such, access to a resource may change based on the change event. Examples of a change in access to a resource may include, without limitation, revoking access to a resource and granting access to a new resource. Based on the change in access to a resource by an identity, a configuration of an application providing access to the resource may be modified for the remote device registered for the identity. For example, when access to a resource is revoked, a configuration of an application may be modified to delete connection information to enable the application to access the resource. In some embodiments, an application that was previously configured and transmitted to remote devices may be modified for its configuration based on the change event. In the example of FIG. 3, an application configured earlier by operations 312 may be modified for its configuration based on the change in access. Device access management system 120 may transmit 334, 336, 338 a modification to the configuration of the application to each of endpoint device 302, endpoint device 304, and endpoint device 306, respectively. In some embodiments, an application may be reconfigured and the entire application may be transmitted to endpoint devices 302, 304, 306.

In some embodiments, device access management system 120 may discover 340 one or more applications to access the enterprise system. For example, device access management system 120 may discover an application that may provide access to a resource accessible to one or more user roles assigned to the identity. In another example, device access management system 120 may discover a new application enabling access to a new resource.

Device access management system 120 may perform operations 342 to configure an application discovered 340 by device access management system 120. In some embodiments, if the application enables access to a resource for which access was not previous provisioned, device access management system 120 may provision an account for an identity associated with endpoint devices 302, 304, 306 to access the resources. An account may be provisioned based on one or more user roles associated with the identity. Access to the resource may be determined based on the one or more user roles. In some embodiments, device access management system 120 may identify an account providing access to a resource accessible using the discovered application. The discovered application may be configured to access the resource using the remote device(s) (e.g., endpoint devices 302, 304, 306) registered for the identity.

Device access management system 120 may transmit the discovered application once the application is configured. The configured application may be transmitted 344, 346, 348 to each of endpoint device 302, endpoint device 304, and endpoint device 306 registered for the identity of the user.

Figure 4:
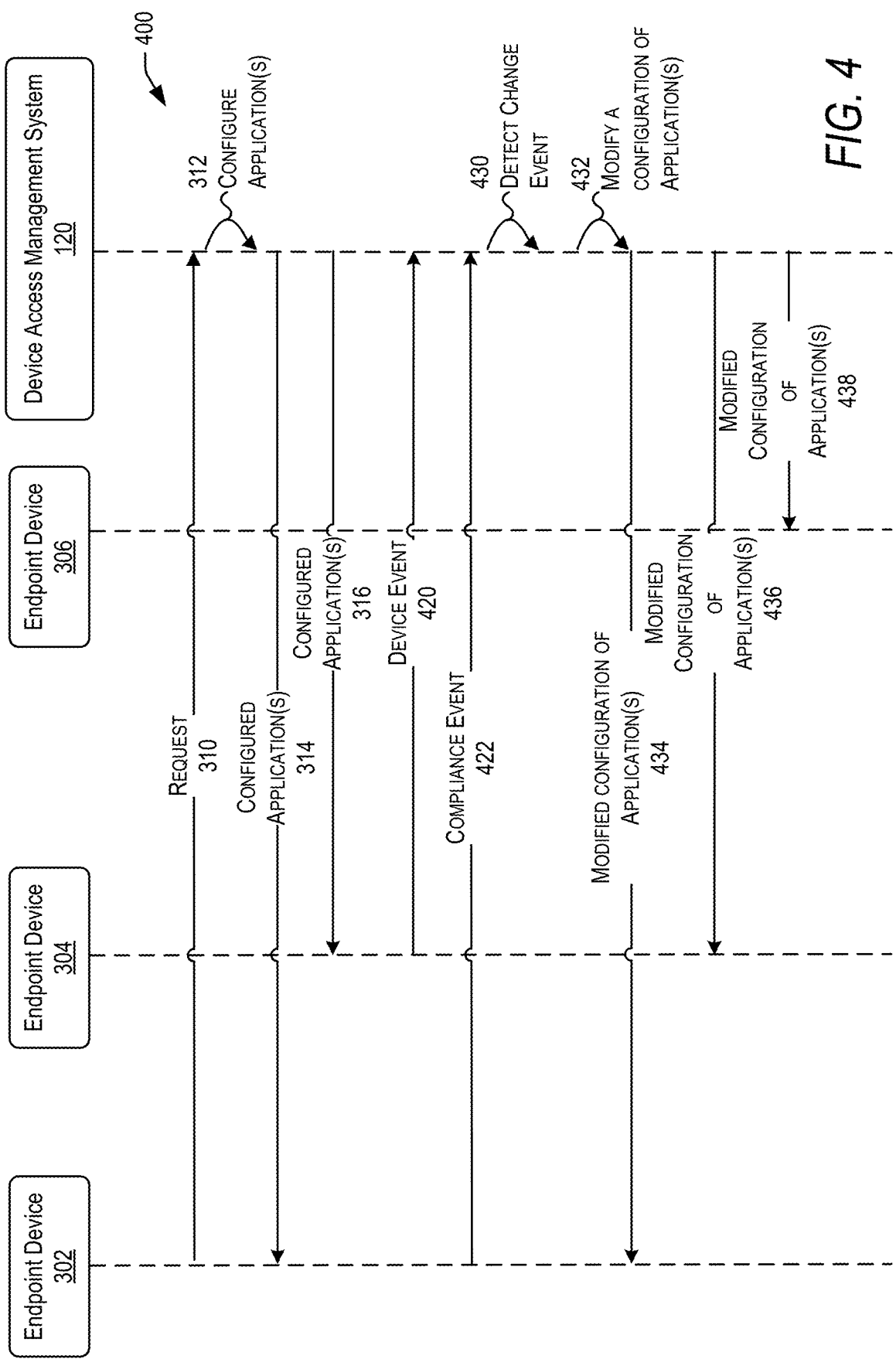
FIG. 4 illustrates a sequence of operations for provisioning of applications to remote devices according to some embodiments of the present invention.

In some embodiments, device access management system 120 may modify a configuration of an application based on different types of change events that occur in an enterprise system. Continuing from the example in FIG. 3, FIG. 4 illustrates an example of a sequence of operations 400 in which device access management system 120 may provision applications to remote devices according to some embodiments of the present invention. Specifically, the examples in FIG. 4 illustrate operations device access management 120 may perform to configure applications based on change events, each of which may affect access to an enterprise system. A change event may be detected from information received from a remote device registered to access the enterprise system. A change event can be detected by device access management system 120 based on information received from the enterprise system, or one or more other systems (e.g., identity management system 140 and user access management system 130) supporting the enterprise system. In this example, operations 400 may occur after operations 300 have been performed in the example illustrated in FIG. 4. In some embodiments, all or some of operations 400 may occur concurrently with operations 300 based on when change events are detected.

Device access management system 120 may receive information indicating a change event (e.g., a compliance event or a device event) from one or more remote devices. For example, device access management system 120 may receive information about a device event 420 from endpoint device 304. Information 420 may indicate a change at endpoint device 304, which may affect access to the enterprise system. In some embodiments, information 420 may include device information that may be used to identify a change in endpoint device 304. For example, a change in endpoint device 304 may correspond to a change in hardware of endpoint device 304 (e.g., jail-breaking performed on endpoint device 304), a change in software of endpoint device 304 (e.g., installation of a black-listed application or upgrade to unsupported operating system), or other change in operation and/or use of endpoint device 304. In another example, device access management system 120 may receive information about a compliance event 422 from endpoint device 302. Information 422 may be determined by a secure container application executing on the remote device. The information about the compliance event 422 may include device synchronization information that may be used to assess compliance of the remote device. In some embodiments, the information about the compliance event may indicate a compliance or non-compliance of the remote device.

Device access management system 120 may perform operations 430 to detect a change event for one or more of remote devices (e.g., endpoint devices 302, 304, 306). A change event may be detected based on the information (e.g., information 420 or information 422) received from a remote device. In some embodiments, device access management system 120 may detect a change event based on information received from an enterprise system, or one or more other systems (e.g., identity management system 140 and user access management system 130) supporting the enterprise system. The information may indicate a change event or may be used to detect a change event. For example, the information may indicate a change in a user role associated with an identity of a user that is registered for endpoint devices 302, 304, 306. In another example, the information may indicate a change in an access policy for a resource. The change event may cause a change in access to the enterprise system. The change in access may change access to a resource accessible from remote devices registered for a user.

A configuration of the application on those remote devices may be modified to adjust access to a resource affected by a detected change event. A change in access may include granting or denying access to a resource, or one or more features of a resource. Device access management system 120 may perform operations 432 to determine whether a configuration of an application on any of endpoint devices 302, 304, 306 needs to be modified to reflect access based on the change event. In some embodiments, a configuration of an application may be modified on all or some remote devices registered to a user. In one example, when a change event is a compliance event related to a non-compliance defined by a compliance policy, device access management system 120 may determine access to resource(s) based on the compliance policy.

Based on the accessible resources, device access management system 120 may determine applications that can be configured to access the resources accessible to the user role(s) associated with an identity registered for each of endpoint devices 302, 304, 306. Some remote devices may not be affected by the change event because those remote devices do not have an application that is affected by the change. For the application(s) that are installed on an endpoint device, device access management system 120 may automatically modify a configuration of those application(s) according to the access permitted to the user role(s). A configuration of an application may be modified to permit access or deny access to a resource accessed by the application. A configuration of an application may be modified by adding or deleting access information, connection information, or other information related to configuration of a setting of the application. In some embodiments, a new application may be configured for a resource based on access permitted due to the change event. Modifying a configuration of an application may include modifying a configuration of a new application that is not installed on a remote device. A configuration of a new application may be modified by including access information and connection information.

Upon modifying a configuration of an application, device access management system 120 may transmit the application(s) that are modified or the modified configuration of the application(s) to a remote device affected by the change event. In some embodiments, all remote devices (e.g., endpoint devices 302, 304, 306) registered for a user may be affected by the change event. For example, device access management system 120 may transmit 434, 436, 438 a modified configuration of an application to each of endpoint device 302, endpoint device 304, and endpoint device 306, respectively.

By automatically modifying a configuration of an application based on a change event and causing a remote device to be updated with the modified configuration, a user may not be burdened with having to manually request an updated application based on a change event. In some embodiments, a user may be unaware of a change event, such that the user may discover access is not permitted when an application is accessed on a remote device. By automatically providing a modified configuration, the user may be able to access a resource, if permitted, by using an application that is automatically configured. Because a user may have registered different types of remote devices, some of which may be configured differently for the same application, the user may not be burdened with having to obtain and individually configure each instance of an application affected by a change event.

FIG. 5 depicts an example of a data structure 510 for storing information indicating resources accessible to roles in an enterprise system (e.g., enterprise computer system 150) according to some embodiments of the present invention. Information in data structure 510 may indicate one or more resources permitted and/or not permitted by one or more user roles defined for accessing the enterprise system. Information in data structure 510 may be used to determine a configuration of an application that provides access to a resource identified in data structure 510.

Data structure 510 may be implemented as one or a combination of different types of data structures including, without restriction, an array, a record, a relational database table, a hash table, a linked list, or other types of data structures. For purposes of illustration, data structure 510 is shown in an arrangement with a particular number of fields (e.g., fields 512 and 514; however, data structure 510 may be defined by more or fewer fields in different arrangement than shown. Each instance of data structure 510 may be stored in access information data store 168.

Field 512 ("User Roles") in data structure 510 may include information indicating one or more user roles defined for accessing an enterprise system. Field 514 ("Permitted Resources") may include information indicating one or more resources permitted for access by a user role indicated in field 512. In some embodiments, data structure 510 may include information indicating one or more resources that are denied for one or more user roles. In some embodiments, access to features provided by a resource may be controlled based on user roles. Data structure 510 may indicate the feature(s) that are permitted or denied for one or more user roles. In some embodiments, the information in data structure 510 may be determined based on one or more policies, e.g., a compliance policy. In some embodiments, a policy may be accessed to determine access permitted to one or more resource(s) by a user role.

In the examples shown in FIG. 5, entry 520 in data structure 510 may indicate an "administrator" role for field 512 and may indicate permitted resources 514 including a "VPN service," an "Outlook email service," and a "human resource service." Entry 530 in data structure 510 may indicate an "executive" role for field 512 and may indicate permitted resources 514 including an "Outlook email service" and a "human resource service." Entry 540 in data structure 510 may indicate an "employee" role for field 512 and may indicate permitted resources 514 including an "Outlook email service."

FIG. 6 depicts an example of a data structure 610 for storing information identifying a configuration of applications for accessing different resources in an enterprise system (e.g., enterprise computer system 150) according to some embodiments of the present invention.

Data structure 610 may be implemented as one or a combination of different types of data structures including, without restriction, an array, a record, a relational database table, a hash table, a linked list, or other types of data structures. For purposes of illustration, data structure 610 is shown in an arrangement with a particular number of fields (e.g., fields 612-616; however, data structure 610 may be defined by more or fewer fields in different arrangement than shown. Each instance of data structure 610 may be stored in application configurations data store 174. Device access management system 120 may access application configurations data store 174 to retrieve a configuration of an application to be configured.

Information in data structure 610 may indicate one or more applications that provide access to a resource in the enterprise system. Data structure 610 includes connection information indicating a configuration of connection information for an application that provides access to a resource. In some embodiments, an instance of data structure 610 may be created for storing a configuration of applications for an identity in the enterprise system.

Although not shown, data structure 610 may include connection information for a configuration of applications specific to one or more criteria specific to a remote device. For example, the connection information for a configuration of an application may be defined based on a type of a remote device, a platform supported on a remote device, a hardware configuration of a remote device, a software configuration of a remote device, or other information related to operation and/or use of a remote device.

In some embodiments, data structure 610 may include a configuration of one or more settings of an application with respect to a resource accessible using the application. A setting may correspond to a feature of an application providing access to the resource. In some embodiments, a setting may be configured for one or more user roles that will use the application to access the resource.

Field 612 ("Application(s)") in data structure 610 may include information indicating an application for which a configuration is stored in data structure 610. Field 614 ("Resource(s)") may include information indicating a resource accessible using an application indicated by field 612.

Field 616 ("Connection Information") in data structure 610 may include information indicating one or more connection attributes for a configuration of an application indicated by field 612. In some embodiments, the connection attributes may be defined based on device-specific criteria, such as a device type or a platform of a remote device. In some embodiments, connection information for different applications may be stored in connection information data store 170. Connection information may indicate values for one or more connection attributes for a configuration of an application. The connection information may indicate values for connection attributes based on device-specific criteria. Each instance of data structure 610 may be stored in access information data store 174.

In the examples shown in FIG. 6, entry 620 in data structure 610 may indicate a configuration of an "email application" (field 612) for an "Outlook email service" (field 614). Field 616 may indicate connection information for the email application. Connection information in field 616 may indicate values for connection attributes such as a port address of an email service system that provides the email service, a host address for the email service system, and an LDAP for the email service system.

Entry 630 in data structure 610 may indicate a configuration of a "VPN application" (field 612) for a "VPN service" (field 614). Field 616 may indicate connection information for the VPN application. Connection information in field 616 may indicate values for connection attributes such as a port address of a VPN service system that provides the VPN service and a host address for the VPN service system.

Entry 640 in data structure 610 may indicate a configuration of a "human resources (HR) application (field 612) for a "HR service" (field 614). Field 616 may indicate connection information for the HR application. Connection information in field 616 may indicate values for connection attributes such as a port address of a HR service system that provides the HR service and a host address for the HR service system.

Figure 7:
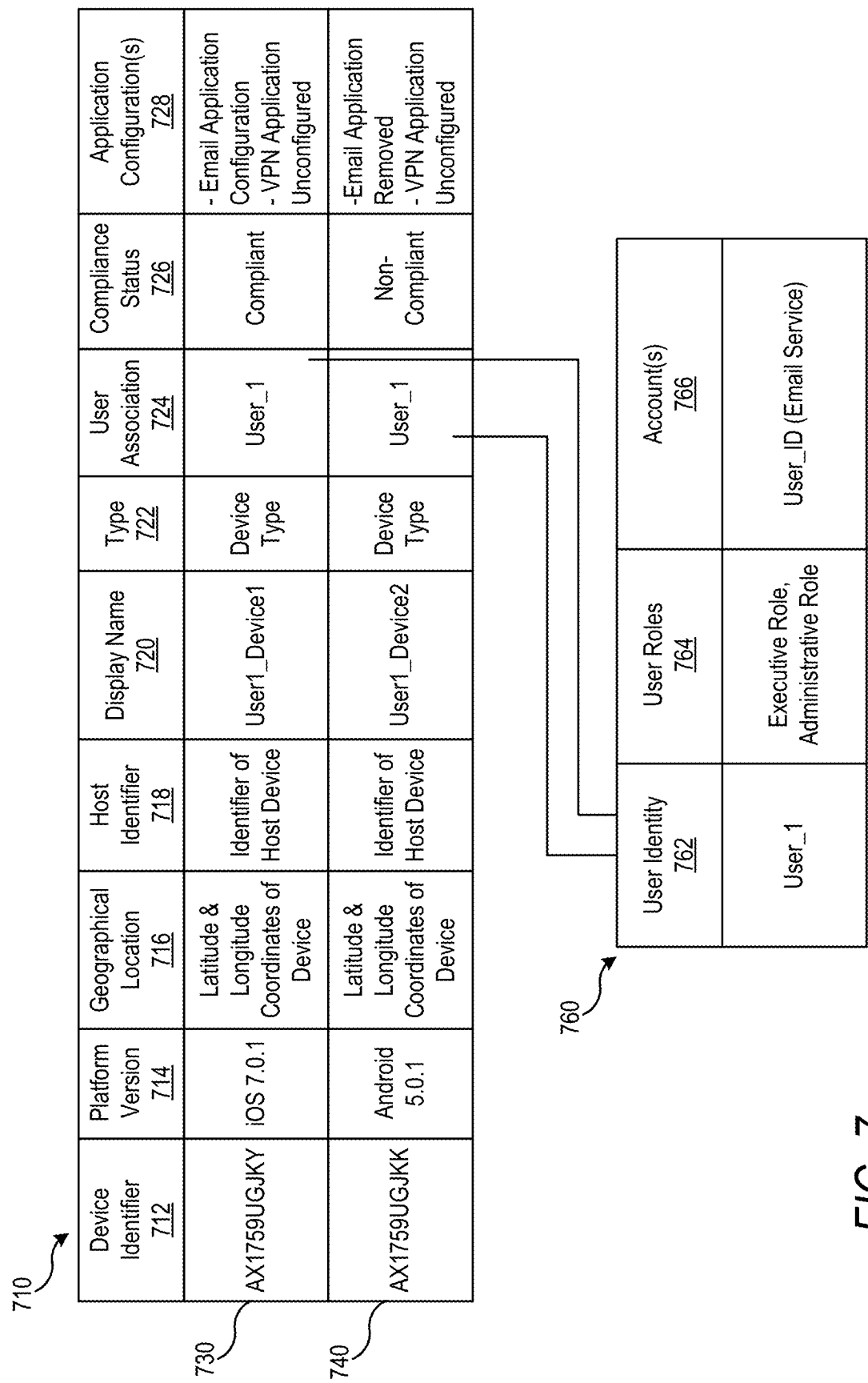
FIG. 7 depicts an example of data structures for storing information about remote devices registered to access an enterprise system according to some embodiments of the present invention.

Now turning to FIG. 7, an example of a data structure 710 is depicted. Data structure 710 may store information about remote devices registered to access an enterprise system according to some embodiments of the present invention. One or more data structures like data structure 710 may be created to store information about a plurality of remote devices. The information stored in data structure 710 for a remote device may be considered for configuring an application for the remote device. Data structure 710 may store information about the configuration of one or more applications for each remote device identified in data structure 710.

Data structure 710 may be implemented as one or a combination of different types of data structures including, without restriction, an array, a record, a relational database table, a hash table, a linked list, or other types of data structures. For purposes of illustration, data structure 710 is shown in an arrangement with a particular number of fields (e.g., fields 712-728); however, data structure 710 may be defined by more or fewer fields in different arrangement than shown. Each instance of data structure 710 may be stored in a data store such as device registry 162.

Data structure 710 may store a device record for each remote device registered to access an enterprise system. Each entry (e.g., entry 730 and entry 740) may be a device record.

Field 712 ("Device Identifier") may indicate a device identifier of a remote device. Examples of a device identifier may include, without limitation, a hardware device identifier of a remote device, a token generated for registration of a remote device with an enterprise system, a UDID, or other type of identifier that can be associated with a remote device and that can uniquely identify the remote device from amongst other remote devices that are registered. Entry 730 may include a device identifier (e.g., "AX1759UGJKY") of a first remote device registered to access an enterprise system and entry 740 may include a device identifier (e.g., "AX1759UGJKK") for a second remote device registered to access the enterprise system.

Field 714 ("Platform Version") may include information identifying a version of a platform configured on a remote device. Examples of a platform version, without limitation, include an operating system (OS) version installed on a remote device, a hardware platform installed on a remote device, or other software installed on a remote device for operation of the remote device. Field 714 in entry 730 may indicate an OS version ("iOS 7.0.1") on a remote device and field 714 in entry 740 may indicate an OS version ("Android 5.0.1") on another remote device.

Field 716 ("Geographical Location") may indicate a geographical location of a remote device. For example, field 716 in each of entries 730, 740 may include information indicating coordinates (e.g., longitude and latitude coordinates) of a last known physical geographical location of the remote device corresponding to the entry. The geographical location may be determined by a global positioning system (GPS) included in or accessible to the remote device.

Field 718 ("Host Identifier") may indicate an identifier of a host system. For example, when a remote device is an endpoint hosted on another device ("host device"), a host identifier may indicate an identifier of the host device. A device identifier of the host device is one example of a host identifier. In some embodiments, a host device may be registered for the remote device, and compliance of a remote device may be assessed based on compliance of the host device.

One or more fields of data structure 710 may include information descriptive of a remote device. For example, field 720 ("Display Name") in entry 730 may indicate a display name (e.g., "User1_Device1") of a remote device corresponding to entry 730 and field 720 in entry 740 may indicate a display name (e.g., "User2_Device2") of a remote device corresponding to entry 740. Descriptive information about a remote device may be provided during enrollment of the remote device. The descriptive information may be used to differentiate one remote device registered for a user from other remote devices registered for that user. Field 722 ("Device Type") may indicate a type of remote device corresponding to a device record. Examples of devices types may include a mobile phone, a table computer, a smartphone, or a wearable device.

In some embodiments, device records may be associated with a user identity established for accessing an enterprise system. As explained above, a remote device may be registered for use by one or more user identities to access an enterprise system. A user identity used to register a remote device may be associated with the device record for that remote device. For example, field 724 may include information indicating a user association with one or more user identities established for accessing an enterprise system. Field 724 may include indicating a location in storage of user identity information. In the example shown in FIG. 7, field 724 in each of entries 730, 740 may include a reference to a location in a memory where a data structure 760 is stored. Data structure 760 may include user identity information corresponding to a user identity associated with the remote devices identified by each of entries 730, 740.

A user identity may be established by an identity management system (e.g., identity management system 140). Data structure 760 may be created and managed by the identity management system. Data structure 760 may be stored in a user information data store 172 accessible to device access management system 120. In some embodiments, device access management system 120 may communicate with identity management system 140 to obtain user identity information associated with a remote device. Shown in FIG. 7 is an example of data structure 760 that stores data about a user identity. Data structure 760 may include a field 762 ("User Identity") that indicates a user identity (e.g., User_1). Data structure 760 may also include data related to registration of the user identity. For example, field 764 in data structure 760 may indicate one or more roles associated with a user identity. Data structure 760 may include field 766 that indicates one or more accounts for accessing one or more resources. Each account may be registered to the user identity. For example, accounts 766 may indicate a user identity (e.g., User_ID) of an account that provides access to an email service.

Based on the user identity association indicated by field 724, one or more roles may be determined from data structure 760 for a user identity associated with a remote device. The role(s) may be used to determine compliance for the remote device.

In some embodiments, compliance information can be stored in data structure 710 for a remote device. The compliance information may be related to compliance of a remote device accessing an enterprise system. Field 726 in data structure 710 may include compliance status information, which indicates a compliance status of a remote device identified by data structure 710.

Field 728 may include information about configuration(s) of applications on a remote device identified by a record in data structure 710. For example, field 728 may indicate a status of configuration of applications on a remote device. In another example, field 728 may include information indicating a configuration of each application on a remote device. For example, field 728 in entry 730 may indicate a configuration on an email application on a remote device identified by entry 730 and may indicate that a VPN application is not configured on that remote device. Field 728 in entry 750 may indicate that an email application on a remote device identified by entry 730 is removed and may indicate that a VPN application is not configured on that remote device. In some embodiments, field 728 may include information indicating a reference to a location in a memory of another data structure (e.g., a data structure in FIG. 8 described below) that includes a configuration of one or more applications on a remote device.

FIG. 8 illustrates an example of a data structure 810 for storing information identifying a status of application configurations for a remote device according to some embodiments of the present invention. One or more data structures like data structure 810 may be created to store information about a configuration of applications on a plurality of remote devices. Data structure 810 may store information indicating a configuration and/or a status of a configuration of one or more applications on one or more remote devices registered for an identity of a user. In some embodiments, the information about the configuration of applications may be identified based on the different user roles associated with a user when a user is assigned multiple user roles.

Data structure 810 may be implemented as one or a combination of different types of data structures including, without restriction, an array, a record, a relational database table, a hash table, a linked list, or other types of data structures. For purposes of illustration, data structure 810 is shown in an arrangement with a particular number of fields (e.g., fields 812-818); however, data structure 810 may be defined by more or fewer fields in different arrangement than shown. Each instance of data structure 810 may be stored in a data store such as device registry 162 or application configuration data store 174.

Field 812 may include information indicating a status of a configuration of an application on a remote device. The status of a configuration may indicate whether an application is installed on a remote device and if so, whether that application is configured.

Field 814 may include access information configured for an application identified by field 812. Examples of access information may include, without limitation, a userid, an access token, or other information for accessing a resource accessible using the application indicated by field 812.

Field 816 may indicate one or more user roles based on which an application identified by field 812 is configured. In some embodiments, an application may not be configured or may be removed when the user role(s) indicated by field 816 are not permitted access to a resource provided by the application.

Field 818 may include connection information for an application indicated by field 818. Connection information may indicate a value for each of one or more connection attributes configured for an application identified by field 812. Field 818 may not indicate connection information when an application is not configured on a remote device.

FIG. 8 illustrates examples of information stored in data structure 810 for a remote device registered for an identity of a user. In one example, field 812 of entry 820 indicates that an email application on a remote device is configured. The email application is configured for an executive role. The email application is configured with access information 814 e.g., user_ID of an email service) and connection information 818. Connection information 818 for entry 820 may indicate a port address of an email service system, a host address of an email service system, and an LDAP of an email service system. In another example, field 812 of entry 830 indicates that a VPN application has been removed from a remote device for an executive role associated with an identity registered for the remote device. Because the VPN has been removed, access information 814 and connection information 818 may include null values.

Figure 9:
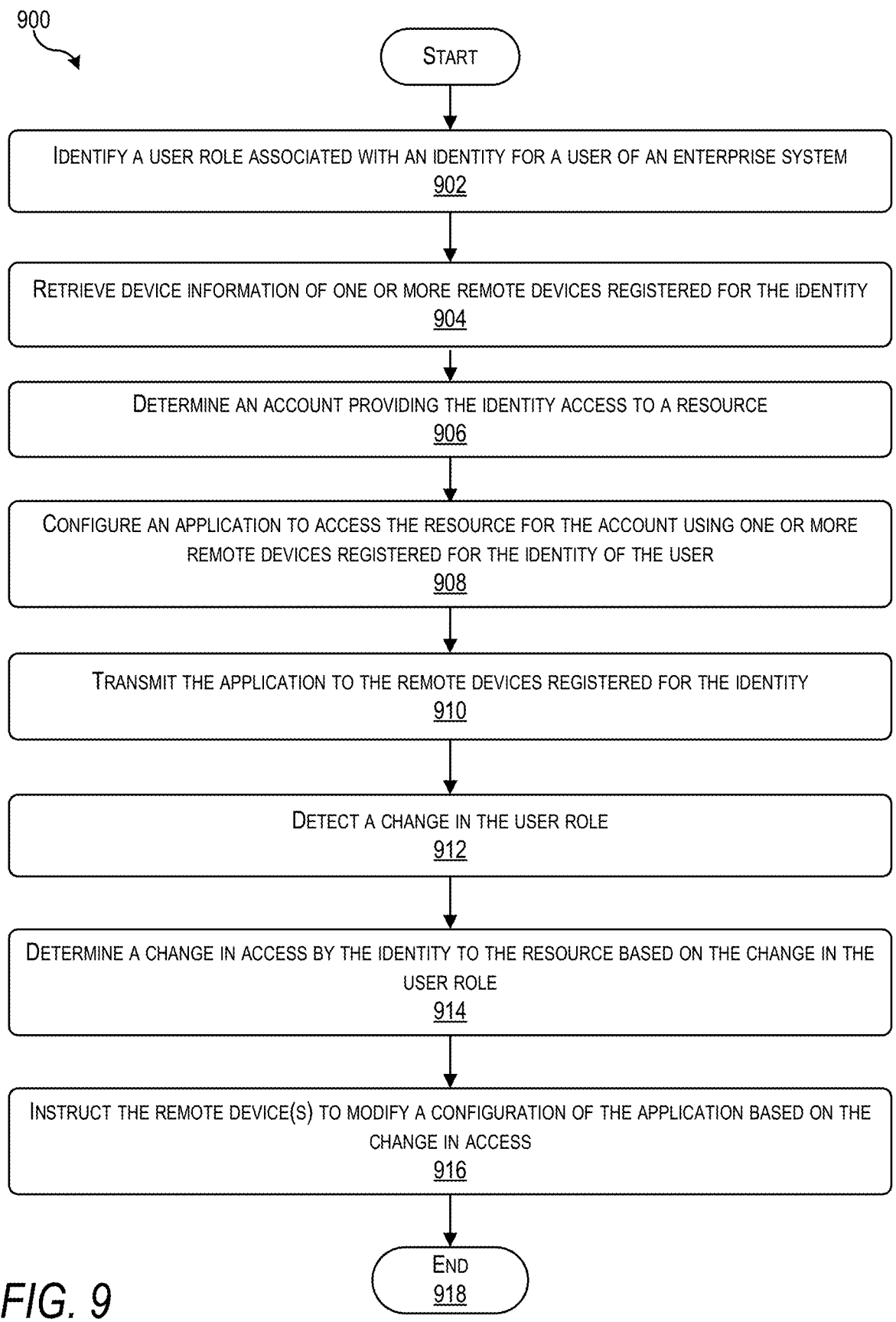
FIG. 9 is a flowchart illustrating a process for provisioning an application to a remote device according to some embodiments of the present invention.

FIG. 9 is a flowchart 900 illustrating a process for provisioning an application to a remote device according to some embodiments of the present invention. In some embodiments, the process depicted in FIG. 9 may be implemented using device access management system 120 described herein.

The process depicted by flowchart 900 may be implemented in software (e.g., code, instructions, program) executed by one or more processing units (e.g., processors cores), hardware, or combinations thereof. The software may be stored in a memory (e.g., on a memory device, on a non-transitory computer-readable storage medium). The particular series of processing steps of flowchart 900 is not intended to be limiting. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. While processing depicted in FIG. 9 is with respect to a single application accessing a resource in an enterprise system, the processing may be performed for any numbers of applications enabling access to the resource and any number of resources accessible from an application. While processing depicted in FIG. 9 is with respect to a single role associated with an identity of a user, the processing may be performed for multiple roles associated with the identity. One of ordinary skill in the art would recognize many variations, modifications, and alternatives.

The processing in flowchart 900 is initiated, at step 902, by identifying a user role associated with an identity for a user of an enterprise system. For example, device access management system 120 may access user information data store 174 to determine a user role associated with an identity of a user. User information in user information data store 174 may indicate one or more identities provisioned to a user to access the enterprise system and one or more roles assigned to those identities. One or more roles may be assigned to the identity of the user. Access to the enterprise system may be defined based on the roles assigned to a user. The user may be a person operating a remote device to access the enterprise system. For example, the user may operate the remote device to request access to a resource in the enterprise system. In another example, the user may be a person that has enrolled a remote device to access the enterprise system.

At step 904, device information may be retrieved for one or more remote devices registered to access an enterprise system. The remote device may have been registered for an identity (e.g., the identity associated with the user role identified at step 902) registered for a user of the enterprise system. For example, device access management system 120 may access device registry 162 to obtain device information about one or more remote devices registered for the identity to access the enterprise system. The device information may indicate a configuration of a remote device registered for an identity of a user. The configuration may indicate an operating system configuration on the remote device and a hardware configuration of the remote device. The configuration of the remote device may be used to configure an application to access a resource.

An account may be determined that provides an identity with access to a resource accessible in an enterprise system, at step 906. An account may be determined based on a user role (e.g., the user role identified at step 902) associated with the identity. An account may be provisioned for one or more resources accessible in the enterprise system. Access to resources may be determined based on the user role(s) associated with an identity. For an account that provides the identity with access to a resource, one or more remote devices registered with the identity may access the resource. The resource may be accessed using one or more applications. Applications may be accessible to a user role based on the resources which are accessible to the user role.

In some embodiments, access information data store (e.g., access information data store 168) may be accessed to determine whether any accounts are provisioned to an identity of a user for accessing a resource provided by a target system. As explained above, a resource in an enterprise system may be provided by a target system. Upon determining that an account is provisioned for an identity of the user, account information may be retrieved from the access information data store, where the account information identifies an account provisioned to the identity of the user. Upon determining that the account is not provisioned for an identity of the user, an account may be provisioned to provide the identity with access to the resource provided by the target system.

At step 908, an application may be configured to access a resource (e.g., the resource for which an account is provisioned at step 906) for an account using one or more remote devices registered for an identity of the user. The remote device(s) may be identified from the device information retrieved at step 904. The application may enable the user to access the resource from a remote device registered for the identity of the user. For example, a messaging application may be configured to access a messaging service for a messaging account using a remote device, which is registered to a user associated with the account. An application may be configured with connection information to connect to a target system that provides the resource. Examples of connection information include a port address of the target system, a host address of the target system, and an LDAP of the target system. An application may be configured with access information to access the resource using the account. Examples of access information include a user identity, an access token, or other information identifying access-related information.

Upon configuration of an application, the application may be transmitted, at step 910, to a remote device for which the application is configured. In some embodiments, the application may be transmitted to the remote device upon request to access the application or the resource accessible using the application. For example, the application may be transmitted to the remote device upon selection from an application catalog identifying one or more applications accessible to the remote device. The applications may be stored by a device access management system and transmitted upon request.

At step 912, a change is detected in a user role (e.g., the user role identified at step 902) associated with an identity. The identity may belong to user to whom a remote device is registered. The change in the user role may correspond to a change from one user role to another user role. For example, a change in a user role may correspond to an assignment of a new user role to an identity of a user. A change in a user role may correspond to removing a user role assigned to an identity of a user. User information in user information data store 172 may be accessed to determine the user roles associated with a user. In some embodiments, information about a change in a user role may be obtained from identity management system 140.

A change in access by an identity to a resource may be determined, at step 914. The change in access may be determined based on a change in a user role. Access to the resource may be provisioned based on the user roles permitted to access the resource. Access to the resource by an identity may change based on a change in a user role. For example, access to the resource (e.g., a human resources application) may be revoked or limited based on losing an assignment of a user role (e.g., an administrative user role). In another example, access to a resource (e.g., a human resources application) may be granted based on assignment of a new user role (e.g., an administrative user role) that permits access to the resource.

At step 916, one or more remote devices (e.g., the remote device(s) registered for an identity of a user) may be instructed to modify a configuration of an application based on a change in access (e.g., the change in access determined at step 914). Access to a resource accessible using an application may change based on a change in a user role associated with an identity of a user. As a result of the change in access to the resource, a configuration of an application providing access to the resource may have to be modified. A configuration may be modified for an application on a remote device associated with an identity affected by the change in the user role. The configuration may be modified to adjust access to the resource or to prevent access to the resource.

A configuration of an application may be modified in many ways. A configuration of an application may be modified for its access information, connection information, or other configuration related to use of the application to access a resource. For example, a modification may include deleting connection information in an application to prevent access to a resource. Instructing a remote device to modify a configuration of an application may include sending a message including an instruction indicating the modification to the configuration. The instruction may cause the remote device to modify the configuration according to the instruction. In some embodiments, instructing a remote device to modify a configuration of an application may include configuring the application according to a modification corresponding to the change in access, and sending the configured application to the remote device indicating that the application on the remote device is to be modified with the configured application.

The processing in flowchart 900 may end at step 918.

Figure 10:
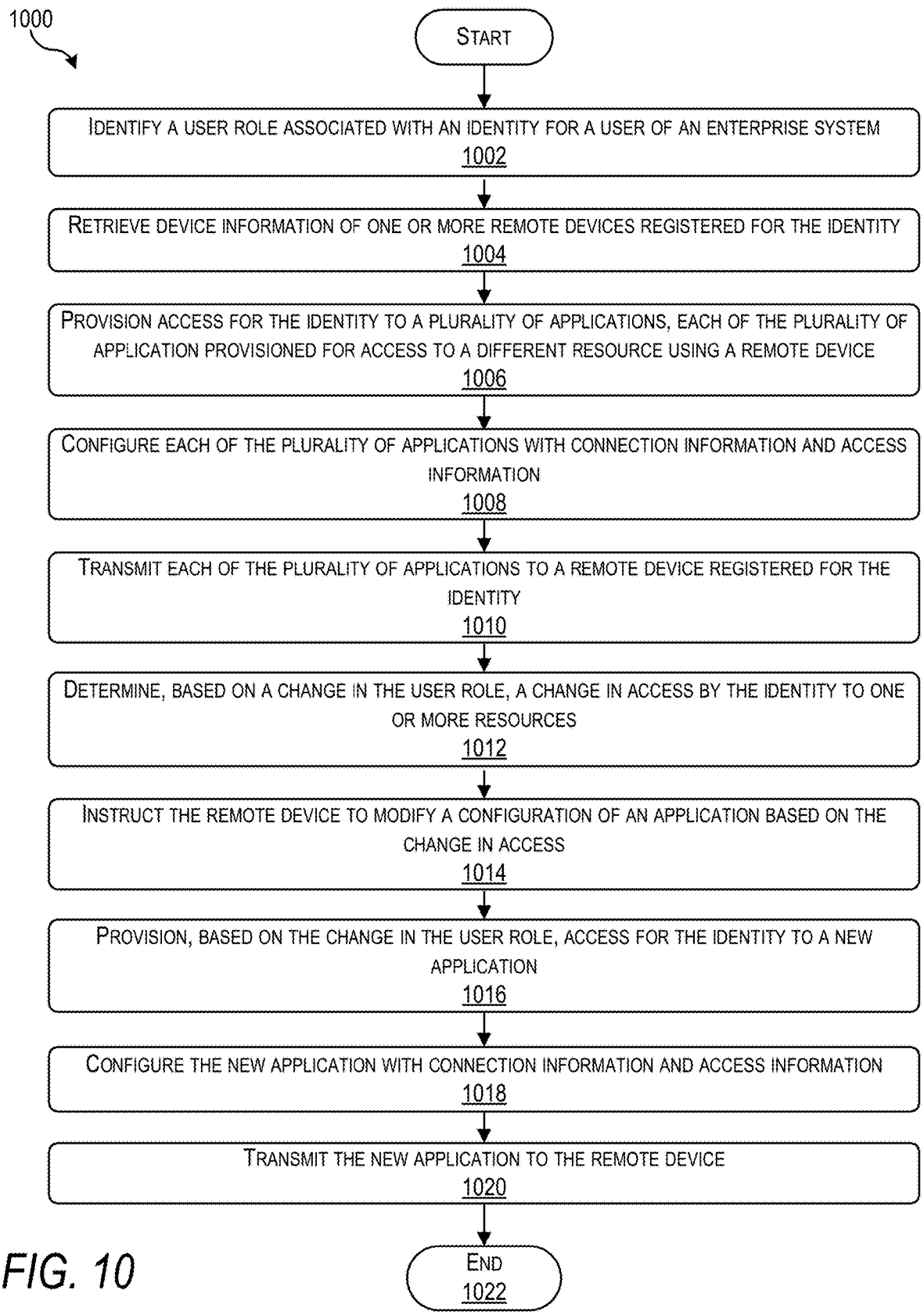
FIG. 10 is a flowchart illustrating a process for provisioning an application to a remote device according to some embodiments of the present invention.

FIG. 10 is a flowchart 1000 illustrating a process for provisioning an application to a remote device according to some embodiments of the present invention. In some embodiments, the process depicted in FIG. 10 may be implemented using device access management system 120 described herein.

The process depicted by flowchart 1000 may be implemented in software (e.g., code, instructions, program) executed by one or more processing units (e.g., processors cores), hardware, or combinations thereof. The software may be stored in a memory (e.g., on a memory device, on a non-transitory computer-readable storage medium). The particular series of processing steps of flowchart 1000 is not intended to be limiting. Other sequences of steps may also be performed according to alternative embodiments. For example, alternative embodiments of the present invention may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. While processing depicted in FIG. 10 is with respect to a single application accessing a resource in an enterprise system, the processing may be performed for any numbers of resources accessible from an application. While processing depicted in FIG. 10 is with respect to a single role associated with an identity of a user, the processing may be performed for multiple roles associated with the identity. One of ordinary skill in the art would recognize many variations, modifications, and alternatives.

The processing in flowchart 1000 is initiated, at step 1002, by identifying a user role associated with an identity for a user of an enterprise system. At step 1004, device information may be retrieved for one or more remote devices registered to access an enterprise system.

At step 1006, access for an identity to a plurality of application is provisioned, wherein each of the plurality of applications is provisioned for access to a different resource in the enterprise system using a remote device registered to access the enterprise system. Each of the different resources may be accessible to the identity. The different resources may be identified as those resources accessible to the identified user roles associated with the identity. Each of the plurality of applications may be identified as an application that provides access to one of the different resources.

Provisioning access to an application may include provisioning an account that provides access to a resource accessible by the application for the identity. The enterprise system may be requested to provision access to each of the different resources accessible by an application. In some embodiments, a target system providing access to a resource may be requested to provision an account for the identity. A human resource system may facilitate the provisioning of a resource. The resources may be accessible to the user role(s) identified for the identity.

At step 1008, each of a plurality of applications, which access is provisioned, may be configured with connection information and access information to access the resource from the application using a remote device. An application may be configured with connection information to connect to a target system that provides the resource. An application may be configured with access information to access a resource using an account provisioned for accessing the resource.

Each of the plurality of application that are configured may be transmitted, at step 1010, to a remote device registered to access the enterprise system. In one example, an application that is configured may be transmitted for storage in memory (e.g., storage associated with an application catalog), wherein the application can be retrieved by the remote device. In another example, an application that is configured may be transmitted to a remote device for which the application is configured.

A change in access by an identity to one or more resources may be determined, at step 1012. The change in access may be determined based on a change in a user role. Access to the resource may be provisioned based on the user roles permitted to access the resource. Access to the resource by an identity may change based on a change in a user role associated with the identity. For example, access to a resource may be revoked for a user role assigned to an identity of a user. In another example, access to a new resource may be granted for a user role assigned to an identity of a user.

At step 1014, one or more remote devices (e.g., the remote device(s) registered for an identity of a user) may be instructed to modify a configuration of an application based on a change in access (e.g., the change in access determined at step 1012). For example, a remote device may be instructed to modify a configuration of an application to prevent access to a resource which has been revoked based on the change in a user role.

In some embodiments, a remote device may not have an application that provides access to a new resource for which access is granted to an identity of a user. At step 1016, access for an identity to a new application may be provisioned based on a change in a user role. As explained above, a resource may be accessible to an identity for which a user role has changed. As such, a new application may be identified that enables access to the resource by the identity of the user. Provisioning access for an identity to the new application includes provisioning an account that provides access to the new application for the identity. At step 1018, the new application may be configured with connection information and access information to access the resource from the application using a remote device registered to the identity. The configured new application may be transmitted to the remote device, at step 1020.

The processing in flowchart 1000 may end at step 1022.

Figure 11:
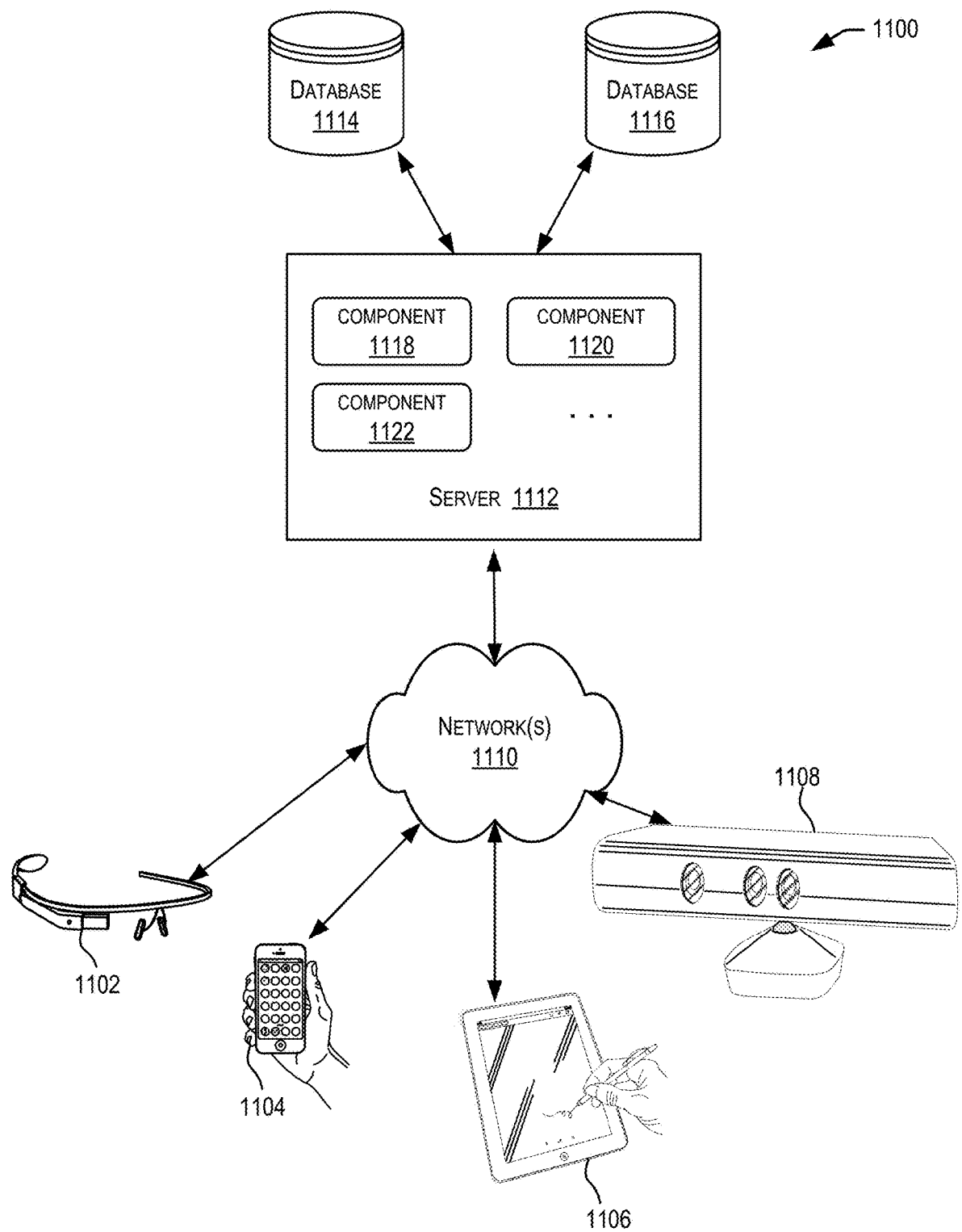
FIG. 11 depicts a simplified diagram of a distributed system for implementing an embodiment.

In the configuration depicted in FIG. 11, software components 1118, 1120 and 1122 of system 1100 are shown as being implemented on server 1112. In other embodiments, one or more of the components of system 1100 and/or the services provided by these components may also be implemented by one or more of the client computing devices 1102, 1104, 1106, and/or 1108. Users operating the client computing devices may then utilize one or more client applications to use the services provided by these components. These components may be implemented in hardware, firmware, software, or combinations thereof. It should be appreciated that various different system configurations are possible, which may be different from distributed system 1100. The embodiment shown in FIG. 11 is thus one example of a distributed system for implementing an embodiment system and is not intended to be limiting.

Client computing devices 1102, 1104, 1106, and/or 1108 may include various types of computing systems. For example, a client computing device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 1110.

Although distributed system 1100 in FIG. 11 is shown with four client computing devices, any number of client computing devices may be supported. Other devices, such as devices with sensors, etc., may interact with server 1112.

Network(s) 1110 in distributed system 1100 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 1110 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 1112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1112 can include one or more virtual machines running virtual operating systems, or other computing architectures involving virtualization. One or more flexible pools of logical storage devices can be virtualized to maintain virtual storage devices for the server. Virtual networks can be controlled by server 1112 using software defined networking. In various embodiments, server 1112 may be adapted to run one or more services or software applications described in the foregoing disclosure. For example, server 1112 may correspond to a server for performing processing as described above according to an embodiment of the present disclosure.

Server 1112 may run an operating system including any of those discussed above, as well as any commercially available server operating system. Server 1112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1112 may include one or more applications to analyze and consolidate data feeds and/or event updates received from users of client computing devices 1102, 1104, 1106, and 1108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1112 may also include one or more applications to display the data feeds and/or real-time events via one or more display devices of client computing devices 1102, 1104, 1106, and 1108.

Distributed system 1100 may also include one or more databases 1114 and 1116. These databases may provide a mechanism for storing information such as user interactions information, usage patterns information, adaptation rules information, and other information used by embodiments of the present invention. Databases 1114 and 1116 may reside in a variety of locations. By way of example, one or more of databases 1114 and 1116 may reside on a non-transitory storage medium local to (and/or resident in) server 1112. Alternatively, databases 1114 and 1116 may be remote from server 1112 and in communication with server 1112 via a network-based or dedicated connection. In one set of embodiments, databases 1114 and 1116 may reside in a storage-area network (SAN). Similarly, any necessary files for performing the functions attributed to server 1112 may be stored locally on server 1112 and/or remotely, as appropriate. In one set of embodiments, databases 1114 and 1116 may include relational databases, such as databases provided by Oracle that are adapted to store, update, and retrieve data in response to SQL-formatted commands.

Figure 12:
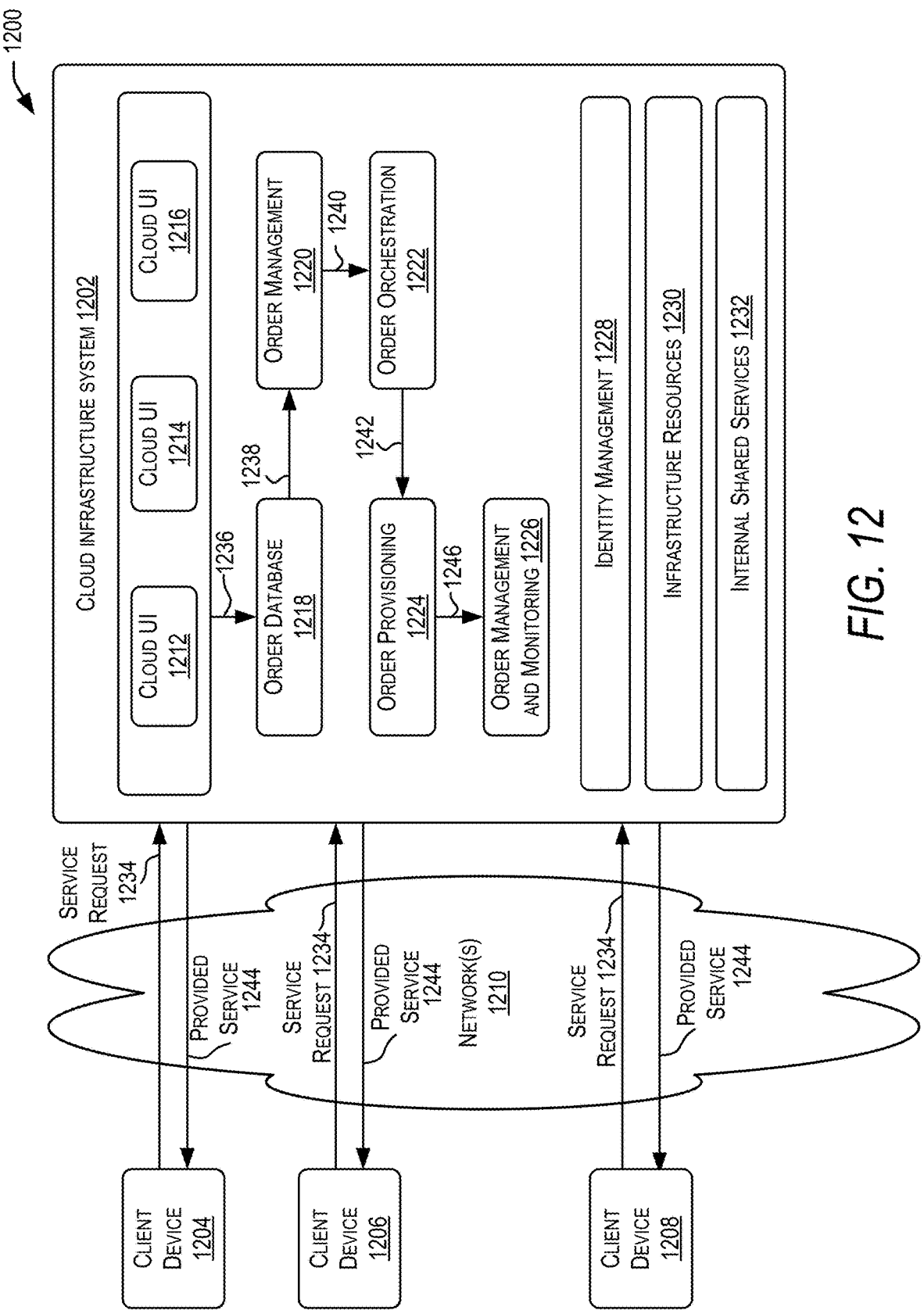
FIG. 12 is a simplified block diagram of one or more components of a system environment in which services may be offered as cloud services, in accordance with an embodiment of the present disclosure.

In some embodiments, a cloud environment may provide one or more services for managing access to an enterprise system using remote devices. FIG. 12 is a simplified block diagram of one or more components of a system environment 1200 in which services may be offered as cloud services, in accordance with an embodiment of the present disclosure. In the illustrated embodiment in FIG. 12, system environment 1200 includes one or more client computing devices 1204, 1206, and 1208 that may be used by users to interact with a cloud infrastructure system 1202 that provides cloud services, including services for managing access to an enterprise system using remote devices. Cloud infrastructure system 1202 may comprise one or more computers and/or servers that may include those described above for server 1112.

It should be appreciated that cloud infrastructure system 1202 depicted in FIG. 12 may have other components than those depicted. Further, the embodiment shown in FIG. 12 is only one example of a cloud infrastructure system that may incorporate an embodiment of the invention. In some other embodiments, cloud infrastructure system 1202 may have more or fewer components than shown in the figure, may combine two or more components, or may have a different configuration or arrangement of components.

Client computing devices 1204, 1206, and 1208 may be devices similar to those described above for client computing devices 1102, 1104, 1106, and 1108. Client computing devices 1204, 1206, and 1208 may be configured to operate a client application such as a web browser, a proprietary client application (e.g., Oracle Forms), or some other application, which may be used by a user of the client computing device to interact with cloud infrastructure system 1202 to use services provided by cloud infrastructure system 1202. Although exemplary system environment 1200 is shown with three client computing devices, any number of client computing devices may be supported. Other devices such as devices with sensors, etc. may interact with cloud infrastructure system 1202.

Network(s) 1210 may facilitate communications and exchange of data between client computing devices 1204, 1206, and 1208 and cloud infrastructure system 1202. Each network may be any type of network familiar to those skilled in the art that can support data communications using any of a variety of commercially-available protocols, including those described above for network(s) 1110.

In certain embodiments, services provided by cloud infrastructure system 1202 may include a host of services that are made available to users of the cloud infrastructure system on demand. In addition to services related to managing access to an enterprise system using remote devices, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 1202 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1202 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 1202 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 1202 may be adapted to automatically provision, manage and track a customer's subscription to services offered by cloud infrastructure system 1202. Cloud infrastructure system 1202 may provide the cloud services via different deployment models. For example, services may be provided under a public cloud model in which cloud infrastructure system 1202 is owned by an organization selling cloud services (e.g., owned by Oracle Corporation) and the services are made available to the general public or different industry enterprises. As another example, services may be provided under a private cloud model in which cloud infrastructure system 1202 is operated solely for a single organization and may provide services for one or more entities within the organization. The cloud services may also be provided under a community cloud model in which cloud infrastructure system 1202 and the services provided by cloud infrastructure system 1202 are shared by several organizations in a related community. The cloud services may also be provided under a hybrid cloud model, which is a combination of two or more different models.

In some embodiments, the services provided by cloud infrastructure system 1202 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1202. Cloud infrastructure system 1202 then performs processing to provide the services in the customer's subscription order.

In some embodiments, the services provided by cloud infrastructure system 1202 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 1202 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 1202 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1202 may also include infrastructure resources 1230 for providing the resources used to provide various services to customers of the cloud infrastructure system. In one embodiment, infrastructure resources 1230 may include pre-integrated and optimized combinations of hardware, such as servers, storage, and networking resources to execute the services provided by the PaaS platform and the SaaS platform, and other resources.

In some embodiments, resources in cloud infrastructure system 1202 may be shared by multiple users and dynamically re-allocated per demand. Additionally, resources may be allocated to users in different time zones. For example, cloud infrastructure system 1202 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1232 may be provided that are shared by different components or modules of cloud infrastructure system 1202 to enable provision of services by cloud infrastructure system 1202. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1202 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1202, and the like.

In one embodiment, as depicted in FIG. 12, cloud management functionality may be provided by one or more modules, such as an order management module 1220, an order orchestration module 1222, an order provisioning module 1224, an order management and monitoring module 1226, and an identity management module 1228. These modules may include or be provided using one or more computers and/or servers, which may be general purpose computers, specialized server computers, server farms, server clusters, or any other appropriate arrangement and/or combination.

In an exemplary operation, at step 1234, a customer using a client device, such as client computing devices 1204, 1206 or 1208, may interact with cloud infrastructure system 1202 by requesting one or more services provided by cloud infrastructure system 1202 and placing an order for a subscription for one or more services offered by cloud infrastructure system 1202. In certain embodiments, the customer may access a cloud User Interface (UI) such as cloud UI 1212, cloud UI 1214 and/or cloud UI 1216 and place a subscription order via these UIs. The order information received by cloud infrastructure system 1202 in response to the customer placing an order may include information identifying the customer and one or more services offered by the cloud infrastructure system 1202 that the customer intends to subscribe to.

At step 1236, the order information received from the customer may be stored in an order database 1218. If this is a new order, a new record may be created for the order. In one embodiment, order database 1218 can be one of several databases operated by cloud infrastructure system 1218 and operated in conjunction with other system elements.

At step 1238, the order information may be forwarded to an order management module 1220 that may be configured to perform billing and accounting functions related to the order, such as verifying the order, and upon verification, booking the order.

At step 1240, information regarding the order may be communicated to an order orchestration module 1222 that is configured to orchestrate the provisioning of services and resources for the order placed by the customer. In some instances, order orchestration module 1222 may use the services of order provisioning module 1224 for the provisioning. In certain embodiments, order orchestration module 1222 enables the management of business processes associated with each order and applies business logic to determine whether an order should proceed to provisioning.

As shown in the embodiment depicted in FIG. 12, at step 1242, upon receiving an order for a new subscription, order orchestration module 1222 sends a request to order provisioning module 1224 to allocate resources and configure resources needed to fulfill the subscription order. Order provisioning module 1224 enables the allocation of resources for the services ordered by the customer. Order provisioning module 1224 provides a level of abstraction between the cloud services provided by cloud infrastructure system 1200 and the physical implementation layer that is used to provision the resources for providing the requested services. This enables order orchestration module 1222 to be isolated from implementation details, such as whether or not services and resources are actually provisioned on the fly or pre-provisioned and only allocated/assigned upon request.

At step 1244, once the services and resources are provisioned, a notification may be sent to the subscribing customers indicating that the requested service is now ready for use. In some instance, information (e.g. a link) may be sent to the customer that enables the customer to start using the requested services.

At step 1246, a customer's subscription order may be managed and tracked by an order management and monitoring module 1226. In some instances, order management and monitoring module 1226 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 1200 may include an identity management module 1228 that is configured to provide identity services, such as access management and authorization services in cloud infrastructure system 1200. In some embodiments, identity management module 1228 may control information about customers who wish to utilize the services provided by cloud infrastructure system 1202. Such information can include information that authenticates the identities of such customers and information that describes which actions those customers are authorized to perform relative to various system resources (e.g., files, directories, applications, communication ports, memory segments, etc.) Identity management module 1228 may also include the management of descriptive information about each customer and about how and by whom that descriptive information can be accessed and modified.

Figure 13:
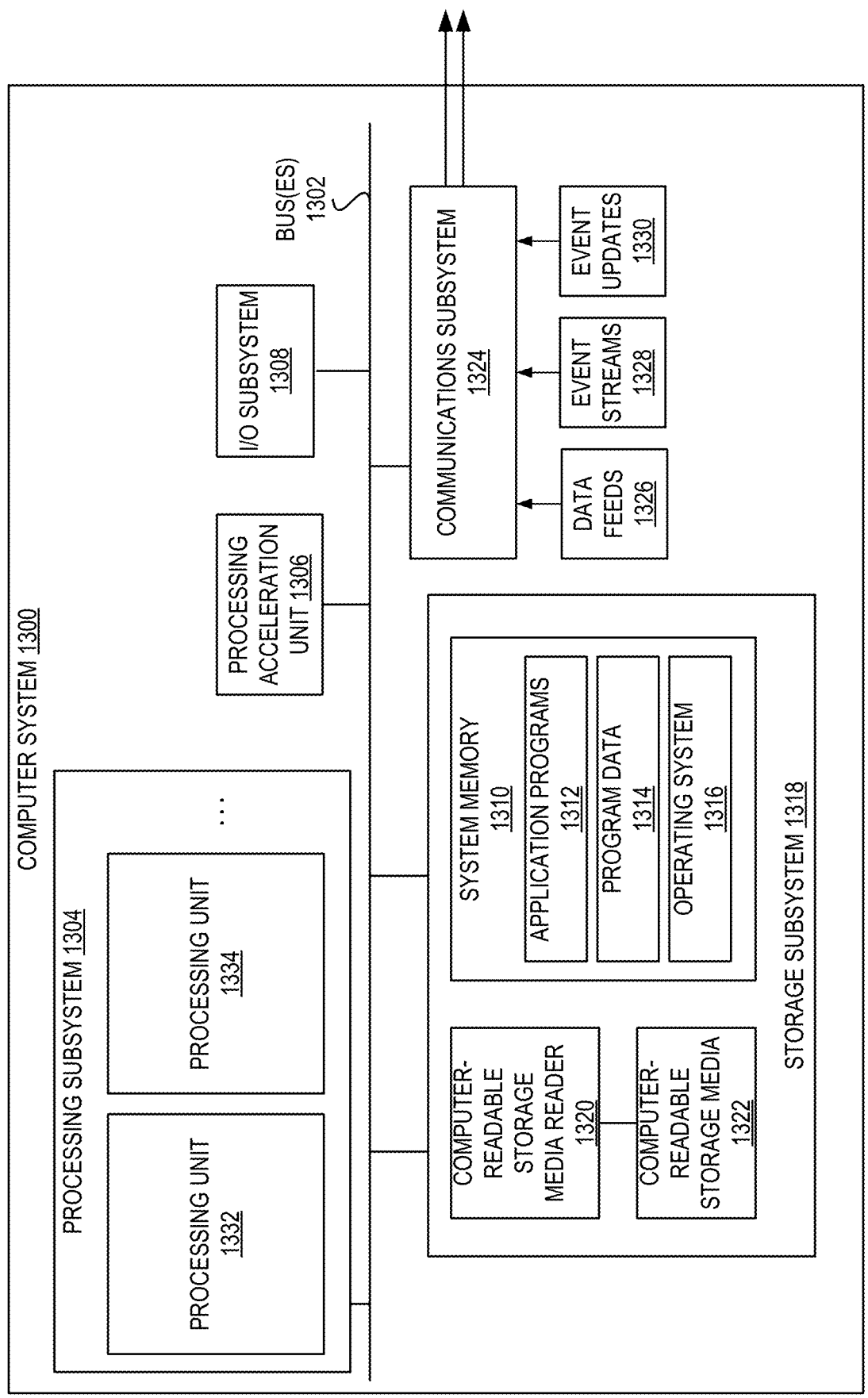
FIG. 13 illustrates an exemplary computer system that may be used to implement an embodiment of the present invention.

FIG. 13 illustrates an exemplary computer system 1300 that may be used to implement an embodiment of the present invention. In some embodiments, computer system 1300 may be used to implement any of the various servers and computer systems described above. As shown in FIG. 13, computer system 1300 includes various subsystems including a processing unit 1304 that communicates with a number of peripheral subsystems via a bus subsystem 1302. These peripheral subsystems may include a processing acceleration unit 1306, an I/O subsystem 1308, a storage subsystem 1318 and a communications subsystem 1324. Storage subsystem 1318 may include tangible computer-readable storage media 1322 and a system memory 1310.

Bus subsystem 1302 provides a mechanism for letting the various components and subsystems of computer system 1300 communicate with each other as intended. Although bus subsystem 1302 is shown schematically as a single bus, alternative embodiments of the bus subsystem may utilize multiple buses. Bus subsystem 1302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1304 controls the operation of computer system 1300 and may comprise one or more processing units 1332, 1334, etc. A processing unit may include be one or more processors, including single core or multicore processors, one or more cores of processors, or combinations thereof. In some embodiments, processing subsystem 1304 can include one or more special purpose co-processors such as graphics processors, digital signal processors (DSPs), or the like. In some embodiments, some or all of the processing units of processing subsystem 1304 can be implemented using customized circuits, such as application specific integrated circuits (ASICs), or field programmable gate arrays (FPGAs).

In some embodiments, the processing units in processing subsystem 1304 can execute instructions stored in system memory 1310 or on computer readable storage media 1322. In various embodiments, the processing units can execute a variety of programs or code instructions and can maintain multiple concurrently executing programs or processes. At any given time, some or all of the program code to be executed can be resident in system memory 1310 and/or on computer-readable storage media 1322 including potentially on one or more storage devices. Through suitable programming, processing subsystem 1304 can provide various functionalities described above for managing access to an enterprise system using remote devices.

In certain embodiments, a processing acceleration unit 1306 may be provided for performing customized processing or for off-loading some of the processing performed by processing subsystem 1304 so as to accelerate the overall processing performed by computer system 1300.

I/O subsystem 1308 may include devices and mechanisms for inputting information to computer system 1300 and/or for outputting information from or via computer system 1300. In general, use of the term "input device" is intended to include all possible types of devices and mechanisms for inputting information to computer system 1300. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1318 provides a repository or data store for storing information that is used by computer system 1300. Storage subsystem 1318 provides a tangible non-transitory computer-readable storage medium for storing the basic programming and data constructs that provide the functionality of some embodiments. Software (programs, code modules, instructions) that when executed by processing subsystem 1304 provide the functionality described above may be stored in storage subsystem 1318. The software may be executed by one or more processing units of processing subsystem 1304. Storage subsystem 1318 may also provide a repository for storing data used in accordance with the present invention.

Storage subsystem 1318 may include one or more non-transitory memory devices, including volatile and non-volatile memory devices. As shown in FIG. 13, storage subsystem 1318 includes a system memory 1310 and a computer-readable storage media 1322. System memory 1310 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1300, such as during start-up, may typically be stored in the ROM. The RAM typically contains data and/or program modules that are presently being operated and executed by processing subsystem 1304. In some implementations, system memory 1310 may include multiple different types of memory, such as static random access memory (SRAM) or dynamic random access memory (DRAM).

By way of example, and not limitation, as depicted in FIG. 13, system memory 1310 may store application programs 1312, which may include client applications, Web browsers, mid-tier applications, relational database management systems (RDBMS), etc., program data 1314, and an operating system 1316. By way of example, operating system 1316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1322 may store programming and data constructs that provide the functionality of some embodiments. Software (programs, code modules, instructions) that when executed by processing subsystem 1304 a processor provide the functionality described above may be stored in storage subsystem 1318. By way of example, computer-readable storage media 1322 may include non-volatile memory such as a hard disk drive, a magnetic disk drive, an optical disk drive such as a CD ROM, DVD, a Blu-Ray® disk, or other optical media. Computer-readable storage media 1322 may include, but is not limited to, Zip® drives, flash memory cards, universal serial bus (USB) flash drives, secure digital (SD) cards, DVD disks, digital video tape, and the like. Computer-readable storage media 1322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1322 may provide storage of computer-readable instructions, data structures, program modules, and other data for computer system 1300.

In certain embodiments, storage subsystem 1300 may also include a computer-readable storage media reader 1320 that can further be connected to computer-readable storage media 1322. Together and, optionally, in combination with system memory 1310, computer-readable storage media 1322 may comprehensively represent remote, local, fixed, and/or removable storage devices plus storage media for storing computer-readable information.

In certain embodiments, computer system 1300 may provide support for executing one or more virtual machines. Computer system 1300 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 1300. Accordingly, multiple operating systems may potentially be run concurrently by computer system 1300. Each virtual machine generally runs independently of the other virtual machines.

Communications subsystem 1324 provides an interface to other computer systems and networks. Communications subsystem 1324 serves as an interface for receiving data from and transmitting data to other systems from computer system 1300. For example, communications subsystem 1324 may enable computer system 1300 to establish a communication channel to one or more client devices via the Internet for receiving and sending information from and to the client devices.

Communication subsystem 1324 may support both wired and/or wireless communication protocols. For example, in certain embodiments, communications subsystem 1324 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1324 can provide wired network connectivity (e.g., Ethernet) in addition to or instead of a wireless interface.

Communication subsystem 1324 can receive and transmit data in various forms. For example, in some embodiments, communications subsystem 1324 may receive input communication in the form of structured and/or unstructured data feeds 1326, event streams 1328, event updates 1330, and the like. For example, communications subsystem 1324 may be configured to receive (or send) data feeds 1326 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1324 may be configured to receive data in the form of continuous data streams, which may include event streams 1328 of real-time events and/or event updates 1330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1324 may also be configured to output the structured and/or unstructured data feeds 1326, event streams 1328, event updates 1330, and the like to one or more databases that may be in communication with one or more streaming data source computers coupled to computer system 1300.

Computer system 1300 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1300 depicted in FIG. 13 is intended only as a specific example. Many other configurations having more or fewer components than the system depicted in FIG. 13 are possible. Based on the disclosure and teachings provided herein, a person of ordinary skill in the art will appreciate other ways and/or methods to implement the various embodiments.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A method comprising:
   determining an account enabling an identity of a user to access a first resource, wherein the first resource is accessible from a first device using a first application, wherein the first device is registered for the identity of the user;
   configuring, by a computer system, the first application based on a user role associated with the identity of the user;
   provisioning, by the computer system, the first application with access to the first resource using the first device registered for the identity of the user;

detecting a change in the user role from a first user role to a second user role;

determining, based on the second user role, a change in access permitted to the identity of the user by the account;

detecting a plurality of devices registered for the identity of the user;

transmitting the first application to the plurality of devices after configuring the first application based on the change in the user role; and instructing each of the plurality of devices to modify a configuration of the first application based on the change in access.

2. The method of claim 1, wherein the provisioning includes:

configuring the first application with access information that enables the first application to access the first resource, wherein the access information is based on access permitted to the identity of the user by the account.

3. The method of claim 1, wherein the provisioning includes:

configuring the first application with connection information that enables the first application to connect the first device to a target system that provides access to the first resource; and transmitting the first application to the first device.

4. The method of claim 3, further comprising:

detecting a second device registered for the identity of the user, wherein the connection information configured for the first application further enables the first application to connect the second device to the target system; and transmitting the first application to the second device.

5. The method of claim 1, further comprising:

detecting a change in the user role from a first user role to a second user role;

determining, based on the second user role, a change in access permitted to the identity of the user by the account; and instructing the first device to modify a configuration of the first application based on the change in access.

6. The method of claim 5, wherein the change in access permitted to the identity of the user includes revoking access permitted to the first resource by the account for the identity of the user, and wherein modifying the configuration of the first application includes deleting connection information configured for the first application.

7. The method of claim 5, wherein the change in access permitted to the identity of the user includes revoking access permitted to the first resource by the account for the identity of the user, and wherein modifying the configuration of the first application includes removing the first application from the first device.

8. The method of claim 5, wherein modifying the configuration of the first application includes adjusting access information configured for the first application.

9. The method of claim 1, further comprising:

transmitting the first application to the plurality of devices upon configuring the first application with connection information.

10. The method of claim 1, further comprising:

detecting a change in the user role from a first user role to a second user role;

determining, based on the second user role, that the account enables the identity of the user to access a second resource, wherein the second resource is accessible from the first device using a second application;

configuring, by the computer system, the second application to connect the first device to a second target system that provides access for the second resource; and transmitting the second application to the first device.

11. A non-transitory computer-readable medium comprising instructions stored thereon, that when executed by one or more processors, cause the one or more processors to perform operations comprising:

determining an account enabling an identity of a user to access a first resource, wherein the first resource is accessible from a first device using a first application, wherein the first device is registered for the identity of the user;

configuring, by a computer system, the first application based on a user role associated with the identity of the user;

provisioning, by the computer system, the first application with access to the first resource using the first device registered for the identity of the user;

detecting a change in the user role from a first user role to a second user role;

determining, based on the second user role, a change in access permitted to the identity of the user by the account;

detecting a plurality of devices registered for the identity of the user;

transmitting the first application to the plurality of devices after configuring the first application based on the change in the user role; and instructing each of the plurality of devices to modify a configuration of the first application based on the change in access.

12. The non-transitory computer-readable medium of claim 11, wherein the provisioning includes:

configuring the first application with access information that enables the first application to access the first resource, wherein the access information is based on access permitted to the identity of the user by the account.

13. The non-transitory computer-readable medium of claim 11, wherein the provisioning includes:

configuring the first application with connection information that enables the first application to connect the first device to a target system that provides access to the first resource; and transmitting the first application to the first device.

14. The non-transitory computer-readable medium of claim 13, wherein the operations further comprise:

detecting a second device registered for the identity of the user, wherein the connection information configured for the first application further enables the first application to connect the second device to the target system; and transmitting the first application to the second device.

15. The non-transitory computer-readable medium of claim 11, wherein the operations further comprise:

detecting a change in the user role from a first user role to a second user role;

determining, based on the second user role, a change in access permitted to the identity of the user by the account; and instructing the first device to modify a configuration of the first application based on the change in access.

16. A server system comprising a memory, the server system executing instructions in a computer program, the computer program instructions comprising program code for:

- determining an account enabling an identity of a user to access a first resource, wherein the first resource is accessible from a first device using a first application, wherein the first device is registered for the identity of the user;
- configuring, by a computer system, the first application based on a user role associated with the identity of the user;
- provisioning, by the computer system, the first application with access to the first resource using the first device registered for the identity of the user;
- detecting a change in the user role from a first user role to a second user role;
- determining, based on the second user role, a change in access permitted to the identity of the user by the account;
- detecting a plurality of devices registered for the identity of the user;
- transmitting the first application to the plurality of devices after configuring the first application based on the change in the user role; and
- instructing each of the plurality of devices to modify a configuration of the first application based on the change in access.

17. The server system of claim 16, wherein the provisioning includes:
- configuring the first application with access information that enables the first application to access the first resource, wherein the access information is based on access permitted to the identity of the user by the account.

18. The server system of claim 16, wherein the provisioning includes:
- configuring the first application with connection information that enables the first application to connect the first device to a target system that provides access to the first resource; and
- transmitting the first application to the first device.

19. The server system of claim 18, wherein the computer program instructions further comprise program code for:
- detecting a second device registered for the identity of the user, wherein the connection information configured for the first application further enables the first application to connect the second device to the target system; and
- transmitting the first application to the second device.

20. The server system of claim 16, wherein the computer program instructions further comprise program code for:
- detecting a change in the user role from a first user role to a second user role;
- determining, based on the second user role, a change in access permitted to the identity of the user by the account; and
- instructing the first device to modify a configuration of the first application based on the change in access.

* * * * *

UNITED STATES PATENT AND TRADEMARK OFFICE
CERTIFICATE OF CORRECTION

| | | |
|---|---|---|
| PATENT NO. | : 11,089,474 B2 | Page 1 of 1 |
| APPLICATION NO. | : 16/161939 | |
| DATED | : August 10, 2021 | |
| INVENTOR(S) | : Maheshwari et al. | |

It is certified that error appears in the above-identified patent and that said Letters Patent is hereby corrected as shown below:

On the Title Page

On page 4, Column 2, under item (56), Other Publications, Line 9, delete "pges." and insert -- pages. --, therefor.

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*